(12) United States Patent
Chinthekindi et al.

(10) Patent No.: US 11,645,333 B1
(45) Date of Patent: May 9, 2023

(54) GARBAGE COLLECTION INTEGRATED WITH PHYSICAL FILE VERIFICATION

(71) Applicant: EMC IP Holding Company LLC, Hopkinton, MA (US)

(72) Inventors: Ramprasad Chinthekindi, San Jose, CA (US); Abhinav Duggal, Milpitas, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 875 days.

(21) Appl. No.: 16/172,302

(22) Filed: Oct. 26, 2018

(51) Int. Cl.
*G06F 16/901* (2019.01)
*G06F 3/06* (2006.01)
*G06F 12/02* (2006.01)

(52) U.S. Cl.
CPC .......... *G06F 16/9014* (2019.01); *G06F 3/067* (2013.01); *G06F 3/0641* (2013.01); *G06F 3/0646* (2013.01); *G06F 12/0261* (2013.01)

(58) Field of Classification Search
CPC .. G06F 16/9014; G06F 3/0641; G06F 3/0646; G06F 3/067; G06F 12/0261
See application file for complete search history.

(56) References Cited

U.S. PATENT DOCUMENTS 9,424,185 B1 * 8/2016 Botelho .................... G06F 3/06
2005/0222979 A1 * 10/2005 Wu ......................... G06F 9/449

* cited by examiner

Primary Examiner — Etienne P Leroux
Assistant Examiner — Husam Turki Samara
(74) Attorney, Agent, or Firm — Dergosits & Noah LLP; Todd A. Noah

(57) ABSTRACT

System generates data structure based on unique identifiers of objects in storages and sets indicators in positions corresponding to hashes of unique identifiers of objects. The system copies active objects from one storage to another, if number of active objects in storage does not satisfy threshold, and resets indicators in positions in data structure corresponding to hashes of unique identifiers of active objects copied to the other storage. The system generates another data structure based on unique identifiers created while generating data structure, positions in other data structure corresponding to hashes of the unique identifiers. System sets indicators in positions in the other data structure corresponding to hashes of unique identifiers of data objects in active storages while generating data structure. System resets indicators in positions in data structure corresponding to hashes of the unique identifiers corresponding to indicators set in positions of the other data structure.

20 Claims, 8 Drawing Sheets

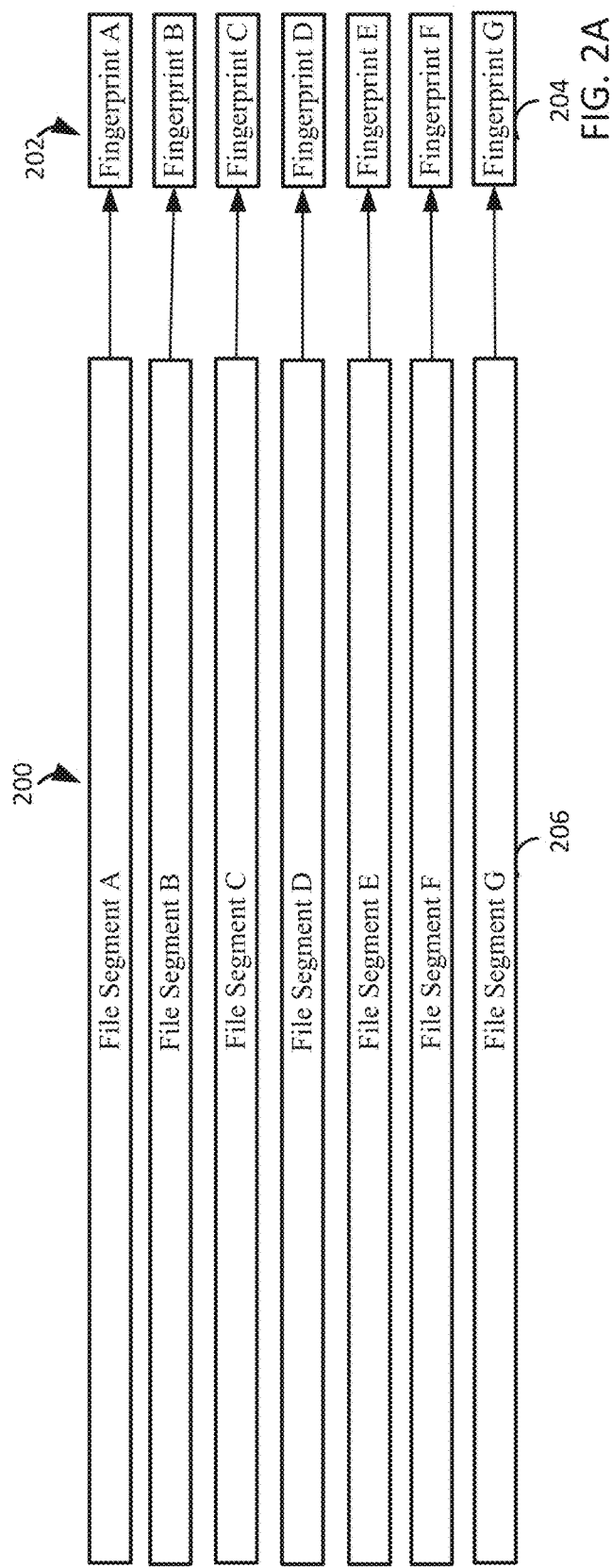
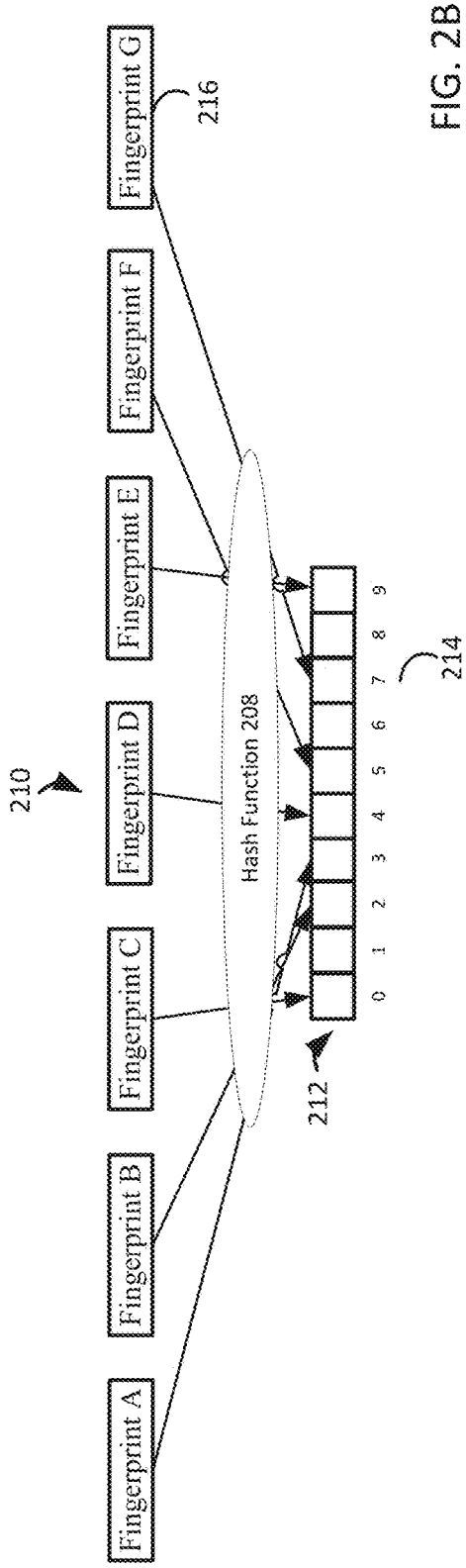
FIG. 2A
FIG. 2B

GARBAGE COLLECTION INTEGRATED WITH PHYSICAL FILE VERIFICATION

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and then instructs the backup/restore application to execute a restore operation to restore a copy of the corresponding backup file(s) for that state to the data object.

An object that is stored in a computer system may be represented by a data structure, such as the tree structure 100 depicted by FIG. 1. A computer system can divide an object into smaller objects, such as dividing a file into files segments. Examples of file segments include a super segment 102 or a level 6 (L6) segment, which may be at the root of the tree structure 100, metadata segments 104, or level 5 (L5) segments to level 1 (L1) segments, which may be intermediate nodes in the tree structure 100 and data segments 106, or level 0 (L0) segments, which are the leaf nodes of the tree structure 100. The level 6 (L6) segments to level 1 (L1) segments may be referred to as level P (Lp) segments. Although this example describes the tree structure 100 as having 7 (L0-L6) levels, the tree structure 100 may have any number of levels.

Each object may be referenced by its fingerprint, which is a relatively-short bit string that uniquely identifies an object. For example, FIG. 2A depicts the file segments 200 that can be referenced by the fingerprints 202, such as the fingerprint G 204 that uniquely identifies the file segment G 206.

A garbage collector generally refers to an organizer of storage for retrievable data in a computer system, which automatically identifies a computer system's objects, identifies which objects are live objects, which are the objects that are in use by at least one of the computer system's programs, and reclaims storage occupied by dead objects, which are the objects that are no longer in use by any of the computer system's programs. A garbage collector can begin by executing what may be referred to as a merge phase, which includes storing an index of unique identifiers of a computer system's objects, such as by storing an index of fingerprints for file segments to a disk. The fingerprint index can map each fingerprint to the object storage, which may be referred to as a container, that stores the file segment which is uniquely identified by the fingerprint, such as the fingerprint index that includes the fingerprint G 204 also includes a mapping to the container that stores the file segment G 206.

The garbage collector can continue by executing what may be referred to as an analysis phase, which includes applying a hash function to each fingerprint in the fingerprint index to generate a one-dimensional array that may be referred to as a hash vector, such that the positions in the hash vector correspond to the fingerprints that uniquely identify their file segments. For example, Ha 2B depicts that the garbage collector applies the hash function 208 to the fingerprints 210 to generate the hash vector 212. Consequently, the bit 214 in the hash vector 212 corresponds to the hash, which is the value returned by a hash function, of the fingerprint G 216, which is the fingerprint G 204 that uniquely identifies the file segment G 206 in FIG. 2A. Although the example describes a computer system as having 7 file segments, fingerprints, and corresponding bits in the hash vector, a computer system may have any number of file segments, fingerprints, and corresponding bits in the hash vector.

The garbage collector can continue by executing what may be referred to as an enumeration phase, which includes identifying the active objects, and then indicating these identifications in the bits of the hash vector that correspond to the objects' unique identifiers. For example, the garbage collector conducts a level-by-level review of the metadata segments 104 to identify their L0 and Lp references, which include the fingerprints of the live L0 data segments 106 and the live Lp metadata segments 104, each of which are in use by at least one of the computer system's programs. Then the garbage collector can continue the enumeration phase by applying the hash function 208 to these identified fingerprints to create hashes, and then setting the bits in the hash vector that correspond to these hashes, such as setting some of the bits 302 to 1 in the hash vector 304 depicted by FIG. 3.

The garbage collector can continue by executing what is referred to as a selection phase, which includes estimating how much of the data storage in each container is for live objects. For example, the garbage collector identifies the fingerprints for the L0 data segments in the container 140, applies the hash function 208 to these identified fingerprints to create hashes, and then checks the bits in the hash vector 304 that correspond to these hashes. If the bit for a fingerprint's hash is set to 1 in the hash vector 304, then the bit corresponds to a fingerprint of a live object. If the bit for a fingerprint's hash is not set to 1 in the hash vector 304, then the bit corresponds to a fingerprint of a dead object.

As part of the selection phase, the garbage collector can continue by selecting a container for garbage collection, which may be referred to as cleaning, based on the number of the objects in the container that are live objects. For example, if the garbage collector has determined that only 10% of the file segments in the container 140 are dead file segments, which are not in use by any of the computer system's programs, then the garbage collector bypasses selection of the container 140 for garbage collection or cleaning, and therefore retains the container 140 as it is. Continuing this example, the garbage collector resets the bits in the hash vector 304 that correspond to the hashes of the fingerprints for the file segments in the container 140, which enables the subsequent processing of containers to not require retention of these file segments, which may be referenced as duplicates in other containers.

In an alternative example, if the garbage collector has determined that 40% of the file segments in the container 140 are dead file segments, then the garbage collector selects the container 140 for garbage collection or cleaning. The garbage collector may evaluate multiple containers in the cleaning range 306 to select any combination of these containers in the cleaning range 306 for garbage collection or cleaning. Although the example describes 40% of a container's dead file segments as exceeding a cleaning criteria or container selection threshold, any cleaning criteria or container selection threshold may be used.

The garbage collector might complete by executing what may be referred to as a copy phase, which includes copying live objects from a selected container that will be reclaimed into another container that will be retained. Continuing the alternative example, the garbage collector creates the new container 250, copies the live file segments in the container 140 into the new container 250, and resets the bits in the hash vector 304 that correspond to the hashes for the fingerprints of the file segments in the new container 250, which enables the subsequent processing of containers to not require retention of these file segments. Possibly completing the copy phase for the alternative example, the garbage collector deletes the container 140, which is a cleaning or a garbage collection that reclaims unused storage space for subsequent reuse. Although examples use numbers such as 140 and 250 to reference containers, any other type of sequential referencing of containers may be used.

If the garbage collector executes the merge, analysis, enumeration, selection, and copy phases while no additional objects are being written to a computer system's containers, then the garbage collector can complete the execution of its phases as described above. However, garbage collection may require significantly more time to complete than the duration of time that a computer system can temporarily suspend the writing of objects to containers. Therefore, the garbage collector can accommodate the writing of objects to containers, which may be referred to as an ingest, while the garbage collector is concurrently executing its phases. Furthermore, the garbage collector can accommodate the writing of deduplicated objects to containers while the garbage collector is concurrently executing its phases. Data deduplication generally refers to a specialized data compression technique for eliminating redundant copies of repeating data.

The garbage collector can identify the writing of objects to containers which occur after the garbage collector started the merge phase until the garbage collector started the enumeration phase, which is depicted as the all live range 308 in FIG. 3 because all of the objects written during this time period are live objects since they have just been written. The garbage collector disables the deduplication of all Lp metadata from the start of the merge phase through the start of the enumeration phase so that metadata which is written is written to new containers, such that the garbage collector can review these new containers for references to data segments during the enumeration phase. For example, between the times that the garbage collector started the merge and enumeration phases, a backup/restore application wrote data to the container 140 and the corresponding metadata to the new container 180, and also wrote new data to the new container 190 and the corresponding metadata to the new container 200. After starting the enumeration phase, the garbage collector reviews the new containers 180-210, identifies the L0 references in the metadata segments in the containers 180 and 200, which identify the fingerprints of the live L0 data segments in the containers 140 and 190, applies the hash function 208 to these identified fingerprints to create hashes, and sets the bits in the hash vector that represent these hashes. When subsequently processing the containers in the cleaning range, the garbage collector will reference the bits for the hashes of the fingerprints for the L0 data segments in the container 140 as indicating live file segments. However, since the new container 190 is not in the cleaning range, the garbage collector will not reference the bits for the hashes of the fingerprints for the L0 data segments in the container 190 as indicating live file segments, such that the garbage collector might not reset the bits for the hashes of the fingerprints for the L0 data segments in the container 190.

Writing an object to a container can resume the use of a dead object. For example, a program in the computer system created the file 60 that included the file segment Z, the backup/restore application wrote the file 60 to the container 160, the program deleted the file segment Z, and the backup/restore application wrote metadata that indicates the deletion of the file segment Z to the container 160. Since the garbage collector has yet to delete the file segment Z from the container 160, the file segment Z is a dead file segment, and the fingerprint index still includes the fingerprint Z for the file segment Z, and still maps the fingerprint Z to the container 160. Then a user of the program instructed the backup/restore application to restore the file segment Z from a backup file, and the program is currently using the restored file segment Z.

The backup/restore application may create a notification to write file segments which include the revived file segment Z when the garbage collector is not executing its phases. Since the fingerprint index still includes the fingerprint Z for the file segment Z. and still maps the fingerprint Z to the container 160, the backup/restore application writes the file segment Z and the corresponding metadata to the container 160 as deduplicated data.

Alternatively, the backup/restore application may create a notification to write file segments which include the revived file segment Z between the times that the garbage collector started the merge and enumeration phases. The garbage collector tracks the resumption of use, or revival, of all dead objects by disabling the deduplication of all Lp metadata from the start of the merge phase through the start of the enumeration phase. Therefore, since the fingerprint index still includes the fingerprint Z for the file segment Z, and still maps the fingerprint Z to the container 160, the garbage collector permits the backup/restore application to write the file segment Z to the container 160 as deduplicated data and write the corresponding metadata to the new container 240. When the garbage collector reviews the metadata in the new containers, which includes the new container 240, the metadata identifies the fingerprint Z of the file segment Z written to the container 160, applies the hash function 208 to the fingerprint Z, and then sets the bits in the hash vector 304 that correspond to the hash for the fingerprint Z of the previously dead file segment Z written to the container 160. When subsequently processing the container 160, the garbage collector will reference this bit as indicating a live file segment, thereby retaining the revival of the previously dead file segment Z.

Since the garbage collector has the capability to track the revival of dead objects, the garbage collector may process the writing of a new object as the revival of a dead object. For example, between the times that the garbage collector started the merge and enumeration phases, a backup/restore application creates a notification to write a new file segment D. and during the enumeration phase the garbage collector applies the hash function 208 to the new fingerprint D for the new file segment D, and then sets the bit in the hash vector 304 that corresponds to the hash for the new fingerprint D. Coincidentally, the hash for the new fingerprint D is the same as the hash for the old fingerprint X of the old file segment X that is a dead segment which is stored by the container HO. Consequently, when the garbage collector processes the container 130 in the cleaning range 306, and reviews the bit set in the hash vector 304 that corresponds to the hash for the new fingerprint D and the old fingerprint X, the garbage collector will process the dead file segment X as a live segment. This collision of bits for the hash of the new fingerprint D and the old fingerprint X may result in the garbage collector not selecting the container 130 for cleaning when the container HO should have been selected for cleaning, or result in the garbage collector creating a new container for the live file segments of the container 130 and copying the dead file segment X to the new container.

After the enumeration phase starts, the garbage collector can identify additional notifications to write objects to containers. If the garbage collector identifies a notification to write to a container that is in the range of containers that the garbage collector has already cleaned, the garbage collector permits this writing of objects to this container. For example, the garbage collector has already cleaned the containers 180-210, is in the process of cleaning the containers 130-170 in the current batch 402, and then identifies a notification from a backup/restore application to write objects to the container 190 as deduplicated data, as depicted by FIG. 4. Since the garbage collector has already cleaned the containers 180-210, the garbage collector permits the backup/restore application to write the objects to the container 190 as deduplicated data. The garbage collector does not need to apply the hash function 208 to the fingerprints for the file segments written to the container 190 or need to set the bits in the hash vector 304 that correspond to the hashes for the fingerprints of the file segments written to the container 190 because the current processing of containers will not reference these file segments that are only written to a container that is already cleaned.

If the garbage collector identifies a notification to write to a container that is in the range of containers that the garbage collector is currently cleaning, the garbage collector may modify at least some of the writing of objects to this container. For example, the garbage collector has already cleaned the containers 180-210, is in the process of cleaning the containers 130-170 in the current batch 402, and then identifies a notification from a backup/restore application to write objects to the container 150 as deduplicated data. Since the garbage collector is currently in the process of cleaning the containers 140-170, the garbage collector instructs the backup/restore application to write the objects to the container 150 as data that has not been deduplicated.

The data that is written to containers in the current batch 402 is written as data that has not been deduplicated to enable the tracking of dead objects that are being revived. For example, if the backup/restore application wrote the file segment Y to the container 150 as deduplicated data, and the container 150 previously stored the file segment Y as a dead object, the deduplication of data would result in writing metadata, which indicates the revival of the file segment Y, to the container 150 instead of resulting in actually writing the file segment Y again to the container 150. The garbage collector processes the file segments that are actually written to the containers being cleaned as live file segments, such that a file segment that is actually written to a container that will be retained is also retained, and a file segment that is actually written to a container which will have its live file segments copy forwarded to a new container is also copy forwarded to the new container. For example, the backup/restore application writes the file segment Y to the container 150 as duplicate data, and the garbage collector copies the live file segments in the container 150 into the new container 250, and also copies the revived file segment Y in the container 150 into the new container 250. If the backup/restore application had not actually written the file segment Y to the container 150 as duplicate data, then the garbage collector would have failed to retain the revival of the previously dead file segment Y.

If the garbage collector identifies a notification to write to a container that is below the range of containers that the garbage collector is currently cleaning, the garbage collector permits this writing of objects to this container. For example, the garbage collector has already cleaned the containers 180-210, is in the process of cleaning the containers 140-170 in the current batch 402, and then identifies a notification from a backup/restore application to write objects to the container 110 as deduplicated data. Since the garbage collector has not yet begun the process of cleaning the containers 100-130, the garbage collector permits the backup/restore application to write the objects to the container 110 as deduplicated data. The garbage collector applies the hash function 208 to the fingerprints of these file segments written to the container 110, and then sets the bits in the hash vector 304 that correspond to the hashes for the fingerprints of the file segments written to the container 110 because the subsequent processing of container 110 will reference the bits for these file segments.

If the backup/restore application wrote file segment V to the container 110 as deduplicated data, and the container 110 already stored file segment V as a dead object, the deduplication of data would result in not writing the file segment V again to the container 110. However, the garbage collector would identify the L0 references in the write notification for the container 110, which identify the fingerprints of the live L0 data segments in the container 110, apply the hash function 208 to these identified fingerprints to create hashes, and set the bits in the hash vector that correspond to these hashes, thereby retaining the revival of the previously dead file segment V.

FIG. 4 depicts that the garbage collector cleans containers from the log head, which are the higher numbered and more recently created containers in the cleaning range, to the log tail, which are the lower numbered and less recently created containers in the cleaning range. For example, the relatively old container 100 and the relatively new container 200 both store the file segment W, and the garbage collector processes the newer container 200 first, r by retaining the newer container 200 which stores the file segment W or by creating an additional container 220 that stores the file segment W, and then resetting the bit in the hash vector 304 that corresponds to the hash for the fingerprint W of the file segment W. Since the older container 100 was created before the newer container 200 was created, the older container 100 is more likely to store dead segments than the newer container 200, such that the percentage of live segments in the old container 100 is more likely to satisfy the container selection threshold for cleaning than the percentage of live segments in the new container 200. Having reset the bit corresponding to the hash for the fingerprint W after processing the newer container 200, the garbage collector processes the file segment W as a dead segment when determining whether to select the older container 100 for cleaning, which may result in the percentage of live segments in the older con 100 satisfying the container selection threshold for cleaning. In contrast, the garbage collector processing the file segment W as a dead segment for the newer container 200 would be less likely to result in the percentage of live segments in the newer container 200 satisfying the container selection threshold for cleaning. Consequently, the garbage collector cleaning the newer containers in the cleaning range before cleaning the older containers in the cleaning range is more likely to reclaim some of the storage space occupied by older containers, which would have otherwise remain inefficiently allocated.

BRIEF DESCRIPTION OF THE DRAWINGS

FIGS. 2A-B illustrate a block diagram of example relationships between segments, fingerprints, and bits in a hash vector for garbage collection integrated with physical file verification, under an embodiment

DETAILED DESCRIPTION

A backup solution, such as EMC's Data Domain, can provide data invulnerability architecture at every component in a file system to ensure data protection and integrity capabilities. The verification of files in a computer system is an integrity check that can detect any data corruption and report the data segments that are missing in the computer system. Logical file verification can verify a file in a file system by reviewing each newly created file, such as the file depicted by file segments in FIG. 1, from the top segment to the leaf nodes in a depth first manner, to verify that all referenced data segments exist in a computer system.

Figure 1:
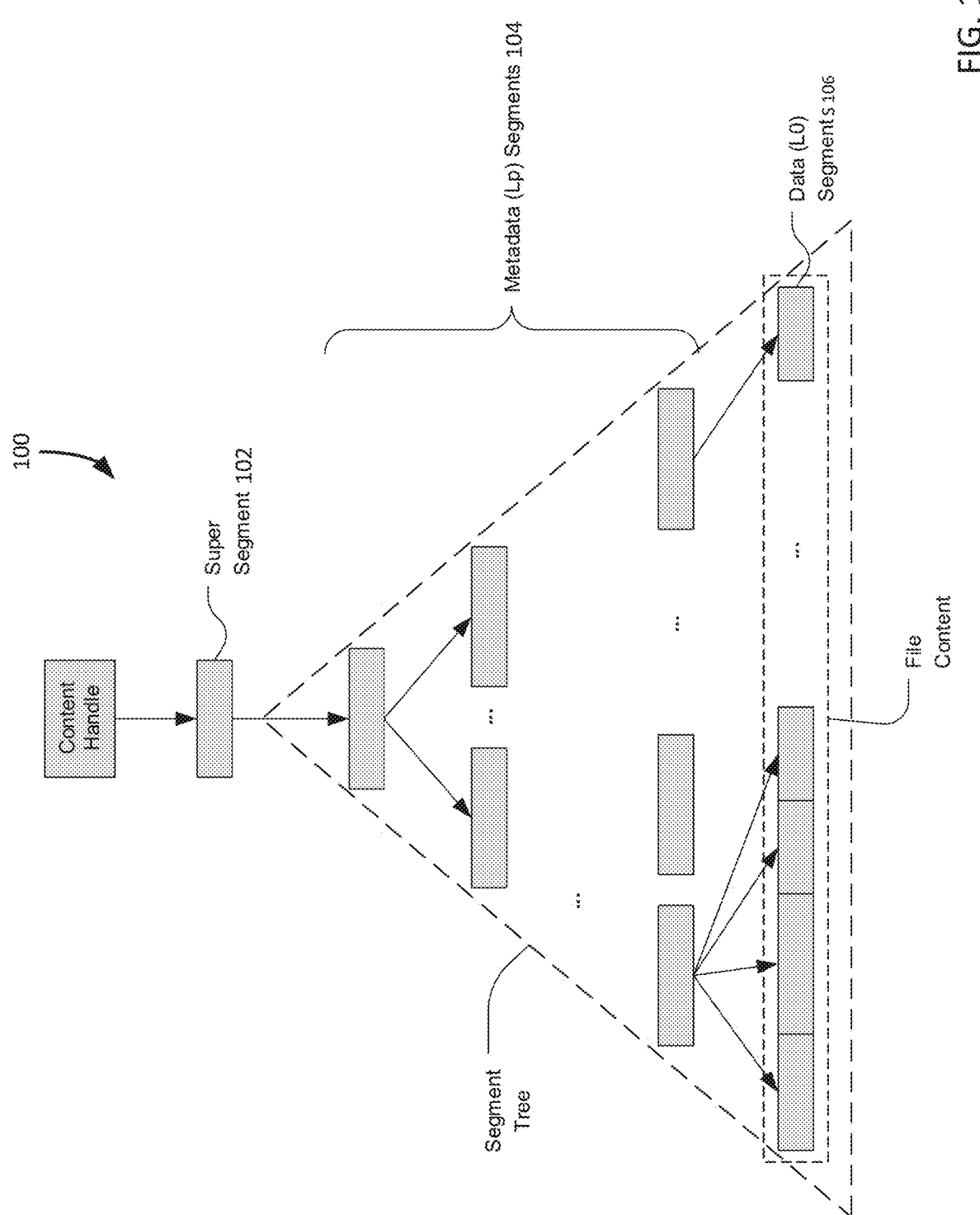
FIG. 1 illustrates a block diagram of an example data structure for garbage collection integrated with physical file verification, under an embodiment.

Physical file verification can verify files in a file system by reviewing the segment trees of all files collectively and reviewing the container set level by level from L6 to L1 segments, such as the segments depicted in FIG. 1. Physical file verification can use an in-memory vector to represent all segments in the computer system and identify any missing segments, thereby identifying any corresponding files as corrupted. Since physical file verification reviews a file system through a level-by-level segment tree scan, its performance is not impacted by the number of files to verify or the locality of the files in the file system. Consequently, physical file verification can complete its verification of a computer system's files significantly faster than a logical file verification can complete its verification of the computer system's files.

Figure 3:
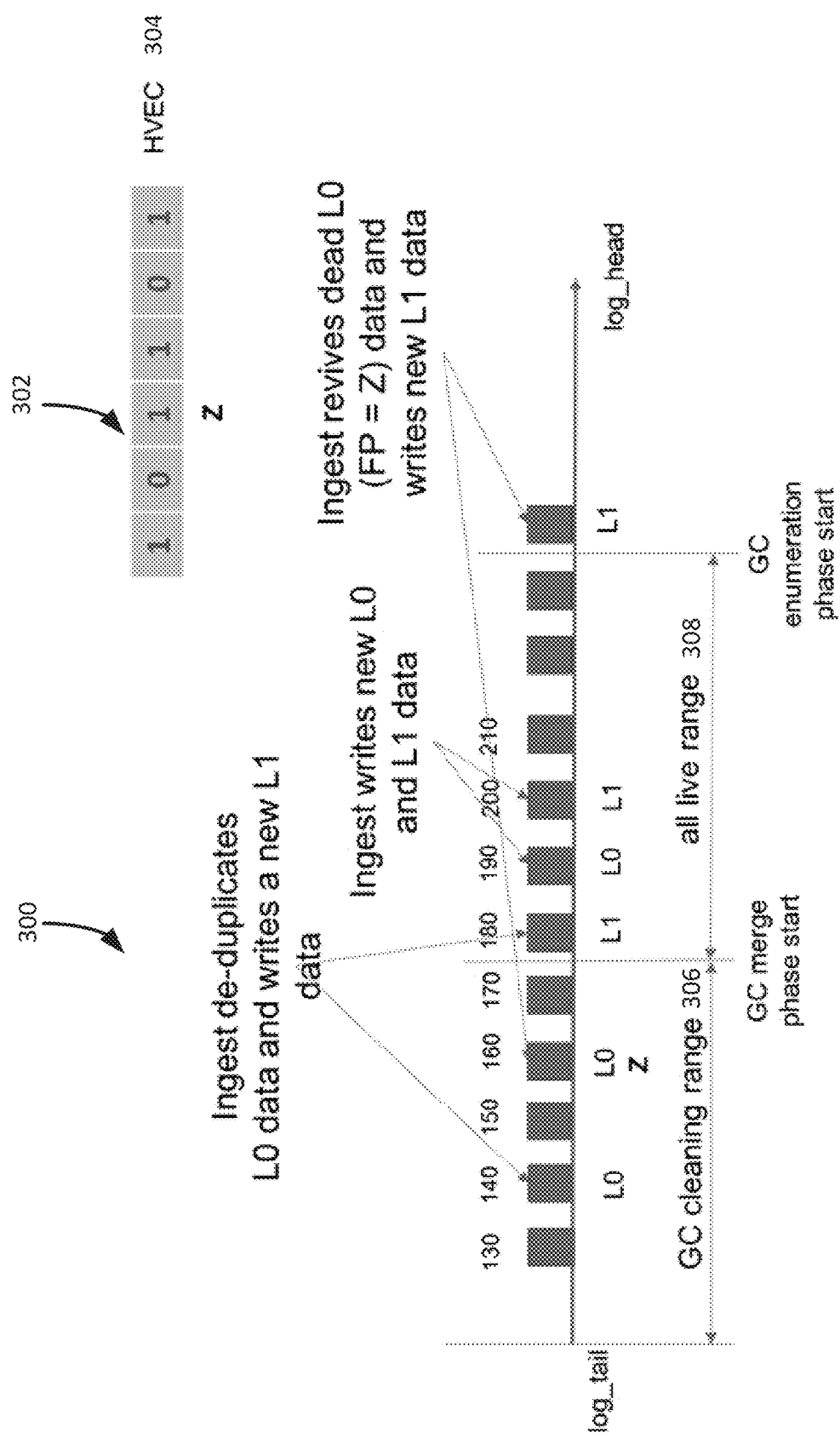
FIG. 3 illustrates a block diagram of containers for garbage collection integrated with physical file verification, under an embodiment.
Figure 4:
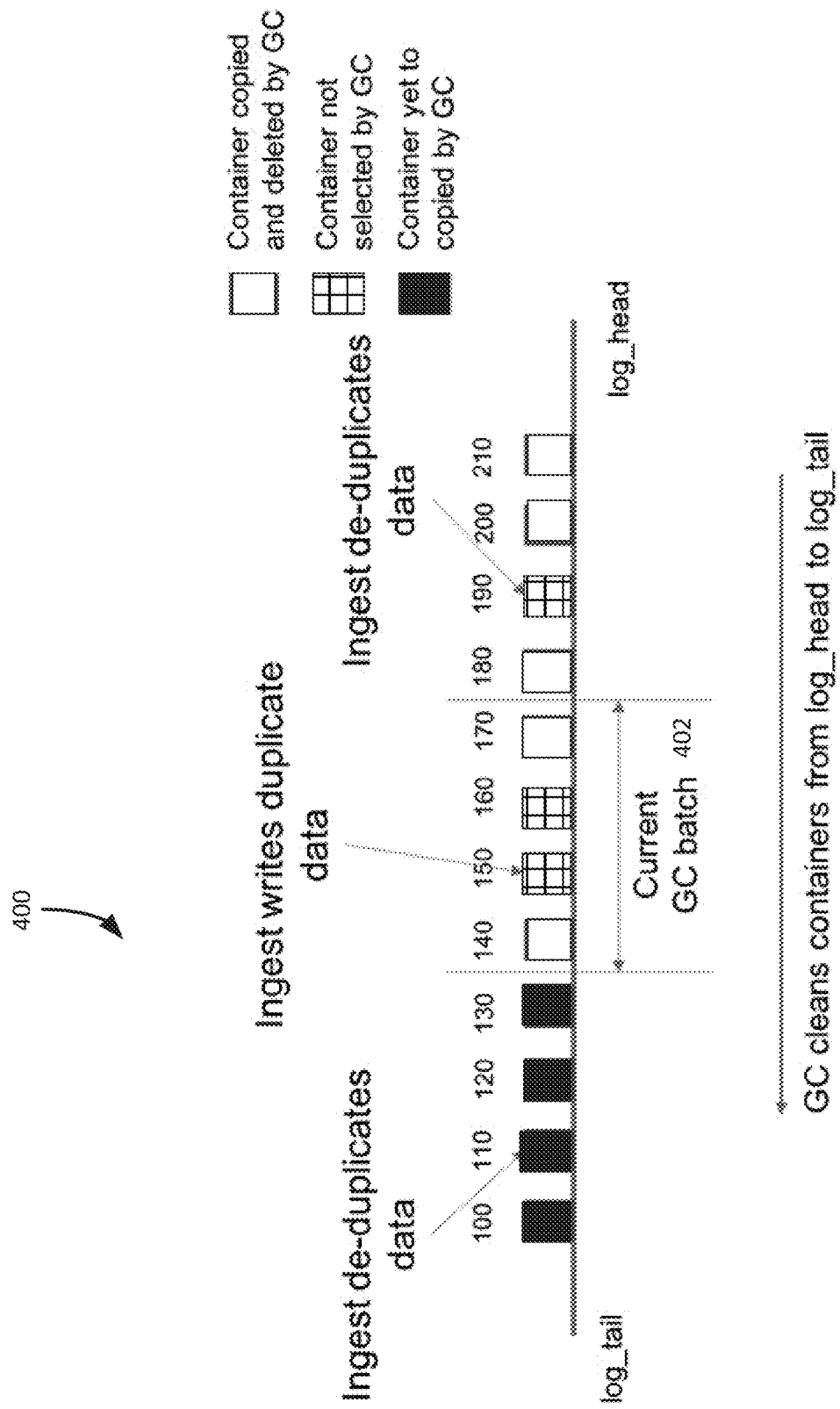
FIG. 4 illustrates another block diagram of containers for garbage collection integrated with physical file verification, under an embodiment.

A physical file verifier can begin by executing what may be referred to as a merge phase, which includes recording unique identifiers of a computer system's objects, such as by storing an index of fingerprints for file segments to a disk. The physical file verifier can continue by executing what may be referred to as an analysis phase, which includes applying a hash function to each fingerprint in the fingerprint index to generate a hash vector, such that the bits of the hash vector correspond to the fingerprints that uniquely identify their file segments. For example, FIG. 2B depicts that the physical file verifier applies the hash function 208 to the fingerprints 210 to generate the hash vector 212. The physical file verifier can continue by executing what may be referred to as an enumeration phase, which includes identifying the live objects, and then indicating these identifications in the bits of the hash vector that correspond to the objects' unique identifiers. For example, the physical file verifier conducts a level-by-level review of the metadata segments 104 to identify their L0 references, which include the fingerprints of the live L0 data segments 106. Then the physical file verifier can continue the enumeration phase by applying the hash function 208 to these identified fingerprints to create hashes, and then setting the bits in the hash vector that correspond to these hashes, such as setting some of the bits 302 to 1 in the hash vector 304 depicted by FIG. 3.

The first three phases of physical file verification are the merge phase, the analysis phase, and the enumeration phase, which are identical to the merge phase, the analysis phase, and the enumeration phase of garbage collection. Whereas the garbage collector follows its enumeration phase by executing the selection phase, the physical file verifier follows its enumeration phase by executing what may be referred to as a verification phase. The verification phase includes the physical file verifier identifying which segments in a container are live objects. For example, the physical file verifier identifies the fingerprints for the L0 data segments in the container 140, applies the hash function 208 to these identified fingerprints to create hashes, and then checks the bits in the hash vector 304 that correspond to these hashes. If the bit for a fingerprint's hash is set to 1 in the hash vector 304, then the bit corresponds to a fingerprint of a live object, and the physical file verifier resets the bit to 0. If the bit for a fingerprint's hash is not set to 1 in the hash vector 304, then the bit corresponds to a fingerprint of a dead object, which in this case means that the physical fie verifier already reset this bit to 0 for a duplicate of the fingerprint that is in a container that the physical file verifier already processed. At the end of the verification phase, the physical file verifier should have reset all of the bits that correspond to fingerprints of live file segments, such that all of the bits in the hash vector 304 should be 0.

However, if a bit in the hash vector remains set to 1 after the verification phase completes, the physical file verifier has identified the existence of a missing file segment. For example, during the enumeration phase the physical file verifier reviewed an L1 metadata segments, which identified its L0 references as the fingerprint R, the fingerprint S, and the fingerprint T, applied the hash function 208 to the fingerprints R, S, and T to create hashes, and set the bits in the hash vector 304 that correspond to the hashes for the fingerprints R, S, and T. Continuing this example, during the verification phase the physical file verifier identifies the fingerprints R and S for the file segments R and S in the container 140, but the physical file verifier does not identify the fingerprint T because the garbage collector erroneously deleted file segment T when copy forwarding the file segments R and S into the container 140. Consequently, when the physical file verifier applies the hash function 208 to the fingerprints R and S to create hashes, determines that the bit for the fingerprint hash is set to 1 and the bit for fingerprint S's hash is set to 1, and resets these bits to 0, the bit for the fingerprint T's hash remains set to 1. Since this bit for fingerprint T's hash remains set to 1 in the hash vector after the verification phase completes, the physical file verifier has identified the existence of a missing file segment.

However, if the hash of the fingerprint for a missing file segment collides with the hash of another fingerprint for another file segment, when the file segment verifier resets the bit for the hash of the other fingerprint to 0, then this same bit will no longer remain set to 1 for the fingerprint of the missing file segment, such that the physical file verifier will not identify this missing file segment. The possibility of a collision between hashes of two different fingerprints depends upon the system's load factor, the hash function used, and the size of the hash vector.

A collision of hashes for different fingerprints can even occur for a missing file segment when using a perfect hash function for the other file segments. A perfect hash function is a collision-free hash function that maps a key set of size N to a vector of size M, where M>N. A perfect hash function for a known key set is created by applying different hash functions that map the known key set to the vector of the specified size until a hash function is identified that maps the known key set to the vector without any collisions. FIG. 2B depicts a perfect hash function 208 that maps 7 fingerprints 210 to the 10-bit hash vector 212 without any collisions. Creating the perfect hash function 208 may require several iterations to map 7 keys to 10 positions without any collisions. As the value of M increases, the time required to create a perfect hash vector reduces because more positions in the hash vector can accommodate the N keys, but more space is required for the increased size of the hash vector. The load factor used to implement a perfect hash vector is the ratio of N to M, such as a load factor of 7/10 means that for every N=7 keys in the system, the perfect hash function reserves m=10 bits for the perfect hash vector. For example, if the garbage collector identified 70 million file segments in a computer system, and the predetermined load factor is 7 keys to 10 bits, then the garbage collector would allocate a 100 million-bit hash vector, and may also allocate 100 million bits for the perfect hash vector. However, since not all of the file segments in the computer system are live, the actual load factor is usually smaller than the initial load factor.

A computer system which includes an L1 metadata segments that identifies its L0 references as the fingerprint R, fingerprint S, and fingerprint T can illustrate an example of a collision of hashes for different fingerprints occurring for a missing file segment when using a perfect hash function for the other file segments. In this example, the fingerprint index initially stored the fingerprints R, S, and T for the file segments R, S, and T, respectively. When the garbage collector erroneously deleted the file segment T while copy forwarding the file segments R and S into the container 140, the computer system responded to the deletion of the file segment 'l' by deleting the fingerprint T from the fingerprint index.

During the next enumeration phase, the physical file verifier reviewed the L1 metadata segments that identified its L0 references as the fingerprint R, fingerprint S, and fingerprint T, applied a perfect hash function to the fingerprints R, S, and T to create hashes, and set the bits in the perfect hash vector that correspond to the perfect hashes for the fingerprints R, S, and T. Continuing this example, during the verification phase the physical file verifier identifies the fingerprints R and S for the file segments R and S in the container 140, but the physical file verifier does not identify the fingerprint T because the garbage collector erroneously deleted the file segment T when copy forwarding the file segments R and S into the container 140. Therefore, when the physical file verifier applies the perfect hash function to the fingerprints R and S to create perfect hashes, determines that the bit for the fingerprint R's perfect hash is set to 1 and the bit for fingerprint S's perfect hash is set to 1, and resets these bits to 0, the bit for the fingerprint T's perfect hash remains set to 1. Since the garbage collector had used the fingerprints R and S, but not the fingerprint 'l', to create the perfect hash function, the perfect hash function is not selected from the potential hash functions based on the capability to map the fingerprint T without collision. Consequently, if no collision occurred for the perfect hash of the fingerprint T, then the bit for fingerprint T's perfect hash remains set to 1 in the perfect hash vector after the verification phase completes, such that the physical file verifier identifies the existence of the missing file segment T. If a collision occurred for the perfect hash for the fingerprint T, then when the physical file verifier processed the other fingerprint that has the same perfect hash as the fingerprint T, the physical file verifier reset the bit for fingerprint T's perfect hash to 0 in the perfect hash vector, such that the physical file verifier fails to identify the existence of the missing file segment T.

However, even if the possibility exists for a collision between a hash of a fingerprint for a missing file segment and the hash of another fingerprint for another file segment, the possibility of a collision for every hash of every fingerprint for every missing file segment is virtually zero. Consequently, if a computer system has multiple missing segments, the probability is very high that physical file verifier identifies the existence of at least one of the missing segments.

A physical file verifier can finish by executing what may be referred to as a report phase, which includes reporting on any missing segments. If all of the bits in the hash vector are reset to 0, the physical file verifier can conclude that the computer system is not missing any segments, and then may or may not report on such a conclusion. If any of the bits in the hash vector remain set to 1, the physical file verifier can identify any missing segments. However, no reverse mapping exists from a bit in the hash vector back to the corresponding fingerprint. Therefore, the physical file verifier conducts a level-by-level review of the metadata segments 104 to identify their L0 references, which include the fingerprints of the live L0 data segments 106. Then the physical file verifier can continue the reporting phase by applying the hash function 208 to these identified fingerprints to create hashes and checking the bits in the hash vector that correspond to these hashes. When the physical file verifier identifies a bit that remains set to 1 in the hash vector, the fingerprint that was used to create the hash that corresponds to the set bit is a fingerprint for a missing segment. The physical file verifier can collect the identifications of all missing segments, and report the missing segments to a user, such as a system administrator. Optionally, the physical file verifier can execute the command sfs_dump-G to conduct a level-by-level review from the missing L0 segments back through the L6 segments that reference the fingerprints of the missing segments.

Since the initial phases of the physical file verifier are identical to the initial phases of the garbage collector, this repetition of phases results in the repeated use of system resources, such as memory, central processing units, and disks. A computer system's memory may be insufficient to execute the garbage collector concurrently with the physical file verifier, such that each of these components must wait on the completion of the other component before starting execution, thereby adversely impacting how frequently each of these components may execute.

The bits in the hash vector that the garbage collector resets during its selection and copy phases would be the same bits in the hash vector that the physical file verifier resets during its verification phase. However, the physical file verifier cannot take advantage of this resetting of common bits by executing its report phase after the garbage collector finishes executing the copy phase because the garbage collector may set some additional bits, which may be referred to as polluting the hash vector, during its enumeration phase that the physical file verifier would not have set during its enumeration phase. This setting of some additional bits occurs because the garbage collector identifies the writing of segments to containers which occur after the garbage collector started the merge phase until the garbage collector started the enumeration phase, which is depicted as the all live range 308 in FIG. 3.

For example, between the times that the garbage collector started the merge and enumeration phases, a backup/restore application wrote the file segment A to the container 140 and the corresponding metadata to the new container 180, and also wrote the file segment D to the new container 190 and the corresponding metadata to the new container 200. When the enumeration phase begins, the garbage collector applies the hash function 208 to the old fingerprint A for the dead file segment A and to new fingerprint D for the new file segment D, and then sets the bits in the hash vector 304 that correspond to the hashes for the old fingerprint A and the new fingerprint D, which may be referred to as polluting the hash vector. Consequently, when subsequently processing the containers in the cleaning range, the garbage collector references the bit for the hash of the fingerprint A for the file segment A in the container 140 as indicating a live file segment, and subsequently resets the bit in the hash vector 304 for the hash of the fingerprint A, thereby clearing the polluted bit for the hash of the fingerprint A.

However, since the new container 190 is not in the cleaning range, the garbage collector will not reference the bit for the hash of the fingerprint D for the data segment D in the container 190 as indicating a live file segment, such that the garbage collector might not reset the bit for the hash of the fingerprint D. Whether or not the garbage collector resets the bit for the hash of the fingerprint D for the data segment D in the container 190 depends on whether or not the hash of the fingerprint D collides in the hash vector with the hash of another fingerprint.

For an example of hashes that collide, the hash for the new fingerprint D is the same as the hash for the old fingerprint X of the old file segment X that is a dead segment which is stored by the container 130. Consequently, when the garbage collector processes the container 130 in the cleaning range 306, and reviews the bit set in the hash vector 304 for the hash for both the new fingerprint D and the old fingerprint X, the garbage collector will process the dead file segment X as a live segment, and reset the bit that corresponds to the hash for the new fingerprint D and the old fingerprint X, thereby clearing the polluted bit for the hash of the fingerprint D.

For an example of hashes that do not collide, the hash for the new fingerprint D is different from the hashes for all other fingerprints. Consequently, since the new container 190 is not in the cleaning range, the garbage collector will not reference the bit for the hash of the fingerprint D for the data segment D in the container 190 as indicating a live file segment, such that the garbage collector does not reset the bit for the hash of the fingerprint D, thereby retaining the polluted bit for the hash of the fingerprint D.

If the hash of the new fingerprint collides in the hash vector with the hash of old fingerprint for a dead segment stored in a container that is in the cleaning range, the garbage collector processes the dead segment as a live segment, which can result in erroneously retaining the dead segment's container as is, or erroneously copying the dead segment to a new container. Such errors in the garbage collector's select and copy phases result only in a slightly inefficient cleaning of containers.

However, bits that were polluted in the hash vector and were not subsequently reset would create a challenge for a physical file verifier that is leveraging the resetting of bits by garbage collector's select phase and copy phase as the equivalent of the resetting of bits by physical file verifier's verification phase. The physical file verifier would process any bit that was polluted in the hash vector and was not subsequently reset as a bit that indicates a missing file segment. Such an erroneous interpretation of a bit could result in the physical file verifier needlessly conducting a level-by-level review of the metadata segments 104 to identify their L0 references, which include the fingerprints of the live L0 data segments 106, applying the hash function 208 to these identified fingerprints to create hashes, and checking the bits in the hash vector that correspond to these hashes.

Embodiments herein integrate garbage collection with physical file verification. A system generates a first data structure based on unique identifiers of objects in object storages, wherein positions in the first data structure correspond to hashes of the unique identifiers of the objects in the object storages. The system sets indicators in positions in the first data structure which correspond to hashes of unique identifiers of active objects in the object storages. The system copies active objects from a first object storage to a second object storage if the number of active objects in the first object storage does not satisfy a threshold. The system resets the indicators in positions in the first data structure which correspond to hashes of unique identifiers of active objects copied to the second object storage. The system generates a second data structure based on unique identifiers of data objects created while generating the first data structure, wherein positions in the second data structure correspond to hashes of the unique identifiers of the data objects. The system sets indicators in positions in the second data structure which correspond to hashes of unique identifiers of data objects that were stored in active object storages while generating the first data structure. The system resets the indicators in positions in the first data structure which correspond to hashes of unique identifiers of data objects that correspond to indicators set in the positions of the second data structure. The system reports any missing objects based on any indicators set in positions in the first data structure.

For example, a garbage collector stores an index of fingerprints for the file segments in the backup files to a disk on a backup server, and then applies a first hash function to the fingerprints to generate a first hash vector. The garbage collector conducts a level-by-level review of the metadata segments for a cleaning range to identify their L0 and Lp references, which include the fingerprints of the live L0 data segments and the live Lp metadata segments in the containers 130-170, and then sets the bits in the first hash vector that correspond to the hashes created by applying the first hash function to the fingerprints of the live L0 data segments in the containers 130-170. The garbage collector identifies the fingerprints for the L0 data segments in the container 120, applies the first hash function to these identified fingerprints to create hashes, and then checks the bits in the first hash vector that correspond to these hashes. If the bit for a fingerprint's hash is set to 1 in the first hash vector, then the bit corresponds to a fingerprint of a live object. Since 40% of the file segments in the container 140 are dead segments, the garbage collector creates the new container 250 and copies the live file segments in the container 120 into the new container 250. The garbage collector resets the bits in the first hash vector that correspond to the hashes for the fingerprints of the file segments in the new container 250, and then deletes the container 120.

A physical file verifier reviews the metadata segments in the container 220 in the all live range, identifies the references to the fingerprints A, B, C, D, E, and F of the live data file segments A, B, C, D, E, and F in the containers 130-210, and applies a second hash function to the fingerprints A, B, C, D, E, and F to generate an all live perfect hash vector. The physical file verifier sets the bits in the all live perfect hash vector that correspond to the hashes created by applying the second hash function to the fingerprints C, D, E, and F of the live L0 data file segments C, D, E, and F in the containers 180-210 in the all live range. The physical file verifier 546 reviews the metadata segments in the all live range 610 to identify their L0 data segments references, which include the fingerprints A, B, C, D, E, and F of the live L0 data file segments A, B, C, E, and F in the containers 130-210, and applies the second hash function to the fingerprints A, B, C, D, E, and F to generate the hashes of the fingerprints A, B, C, D. E. and F. Then the physical file verifier compares the hashes of the fingerprints A, B, C, D, and F to their corresponding bits in the all live perfect hash vector. Since the second bit that is set to 1 in the all live perfect hash vector corresponds to a bit that polluted the perfect hash vector, the physical file verifier applies the first hash function to the corresponding fingerprint F to generate the hash of the fingerprint F, and then resets the bit to 0 in the perfect hash vector that corresponds to the hash of the fingerprint F. The physical file verifier reviews the perfect hash vector, which has no bits set to 1, and therefore reports to a system administrator that no missing file segments have been identified.

Figure 5:
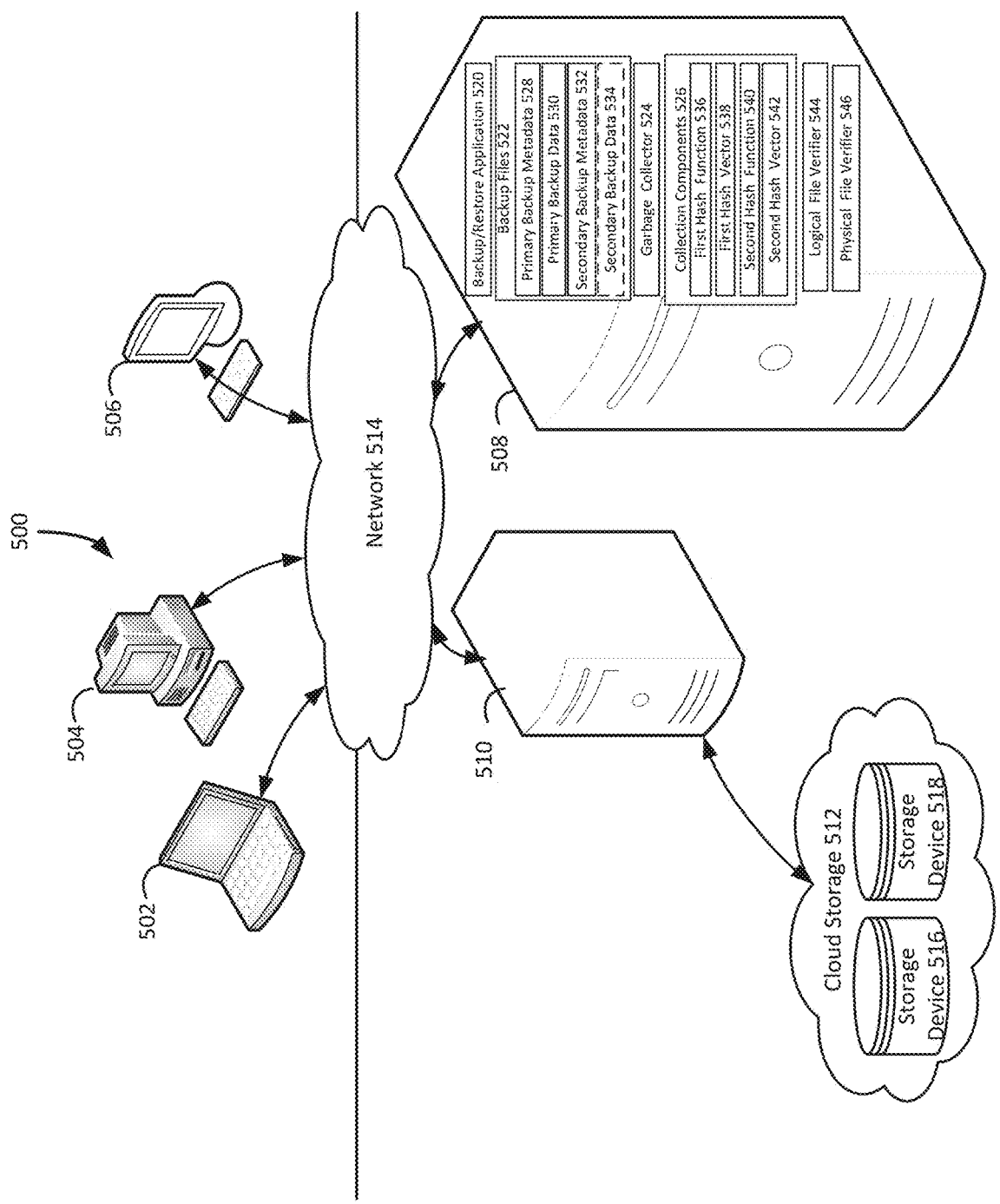
FIG. 5 illustrates a block diagram of an example system for garbage collection integrated with physical file verification, under an embodiment.

FIG. 5 illustrates a block diagram of a system that implements garbage collection integrated with physical file verification, under an embodiment. As shown in FIG. 5, system 500 may illustrate a cloud computing environment in which data, applications, services, and other resources are stored and delivered through shared data-centers and appear as a single point of access for the users. The system 500 may also represent any other type of distributed computer network environment in which servers control the storage and distribution of resources and services for different client users.

In an embodiment, the system 500 represents a cloud computing system that includes a first client 502, a second client 504, and a third client 506; and a first server 508, a second server 510, and a cloud storage 512 that may be provided by a hosting company. Although FIG. 5 depicts the first client 502 as a laptop computer 502, the second client 504 as a personal computer 504, and the third client 506 as an Apple® Macintosh computer 506, each of the clients 502-506 may be any type of computer, such as a server. The clients 502-506 and the servers 508-510 communicate via a network 514. The cloud storage 512 includes a first storage device 516 and a second storage device 518.

The first server 508 includes a backup/restore application 520, backup files 522, a garbage collector 524, and collection components 526. The backup files 522 include primary backup metadata 528, primary backup data 530, and secondary backup metadata 532, and sometimes include secondary backup data 534. The collection components 530 include a first hash function 536, a first hash vector 538, a second hash function 540, and a second hash vector 542. A hash function generally refers to an expression that can be used to map data of arbitrary size to data of a fixed size. The first server 508 also includes a logical file verifier 544 and a physical file verifier 546. Each of the components 520-546 may be combined into larger components and/or divided into smaller components.

FIG. 5 depicts the system 500 with three clients 502-506, two servers 508-510, one cloud storage 512, one network 514, two storage devices 516-518, one backup/restore application 520, one set of backup files 522, one garbage collector 524, one set of collection components 530, and two file verifiers 544-546. However, the system 500 may include any number of clients 502-506, any number of servers 508-510, any number of cloud storages 512, any number of networks 514, any number of storage devices 516-518, any number of backup/restore applications 520, any number of sets of backup files 522, any number of garbage collectors 524, any number of sets of collection components 530, and any number of file verifiers 544-546. The clients 502-506 and the servers 508-510 may each be substantially similar to the system 800 depicted in FIG. 8 and described below in reference to FIG. 8.

FIG. 5 depicts the backup/restore application 520 residing completely on the first server 508, but the backup/restore application 520 may reside completely on any of the clients 502-506, completely on another server that is not depicted in FIG. 5, or in any combination of partially on the first server 508, partially on the clients 502-506, and partially on the other server. The backup/restore application 520 may provide a plug-in to any of the clients 502-506 and/or the first server 508 that enables any of the clients 502-506 and/or the first servers 508 to execute the commands to back up and restore a data object. Even though the following paragraphs describe EMC Corporation's NetWorker® backup/restore application and EMC Corporation's Avamar® backup/restore application as examples of the backup/restore application 520, the backup/restore application 520 may be any other backup/restore application which provides the backup/restore functionalities described in the Background section.

The backup/restore application 520 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data may be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers. Although the functionality examples described in this paragraph apply to EMC Corporation's NetWorker® backup/restore application, one of skill in the art would recognize that other backup/restore applications and their corresponding functionalities may be used. The backup/restore application 520 may also be implemented as a NetWorker® Module For Microsoft Applications, which, as stated above, may reside completely on of the first server 508, completely on any of the clients 502-506, completely on another server that is not depicted in FIG. 1, or in any combination of partially on the first server 508, partially on the clients 502-506, and partially on the other server.

The backup/restore application 520 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup data sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems may be deployed in an integrated solution with EMC Corporation's Data Domain® systems for high-speed backup and recovery of specific data types.

The first server 508, which may be referred to as the backup server 508, may be configured as an EMC Corporation's Data Domain server. The Data Domain operating system delivers scalable, high-speed, and cloud-enabled protection storage for backup, archive, and disaster recovery. Data Domain employs variable-length deduplication to minimize disk requirements, thereby reducing backup and archive storage requirements, and making disk a cost-effective alternative to tape. Deduplicated data may be stored onsite, for immediate restores and longer-term retention on disk, and replicated over a wide area network to a remote site or a service provider site in the cloud for disaster recovery operations, eliminating the need for tape-based backups or for consolidating tape backups to a central location. Data Domain provides the capability to consolidate both backup and archive data on the same infrastructure, thereby eliminating silos of backup and archive storage and associated overhead. Inline write and read verification protects against and automatically recovers from data integrity issues during data ingest and retrieval. Capturing and correcting I/O errors inline during the backup and archiving process eliminates the need to repeat backup and archive jobs, ensuring backups and archiving complete on time and satisfy service-level agreements. In addition, unlike other enterprise arrays or file systems, continuous fault detection and self-healing ensures data remains recoverable throughout its lifecycle on Data Domain. End-to-end data verifications reads data after it is written and compares it to what was sent to disk, proving that it is reachable through the file system to disk and that the data is not corrupted.

The second server 510, which may be referred to as a cloud storage gateway 510, may be a network appliance or server which resides at a customer's premises, and can translate cloud storage application programming interfaces to block-based storage protocols. Examples of cloud storage application programming interfaces include Simple Object Access Protocol (SOAP) and Representational. State Transfer (REST). Examples of block-based storage protocols include Internet Small Computer System Interface (iSCSI), Fibre Channel, and file-based interfaces such as Network File System (NFS) and Server Message Block (SMB), one version of which is also known as Common Internet File System (CMS). A file system interface may be an API (application programming interface) through which a utility or user program requests the storing and retrieving of data. The cloud storage gateway 510 can also serve as an intermediary to multiple cloud storage providers. The cloud storage 512 may be a Google® cloud platform, an Amazon Web Services® cloud platform, a Microsoft® Azure cloud platform, or any other cloud platform.

The garbage collection integrated with physical file verification can begin by generating a first data structure based on unique identifiers of objects in object storages, wherein positions in the first data structure correspond to hashes of the unique identifiers of the objects in the object storages. Generating the first data structure can include storing an index of unique identifiers of the objects in the object storages.

A data structure generally refers to an information organization and storage format that enables efficient access and modification. A unique identifier generally refers to a sequence of characters used to refer to an entity as being the only one of its kind. An object generally, refers to a group of information. An object storage generally refers to a portion of any data retention device that retains a group of information. A position generally refers to a particular place where something is located. A hash generally refers to a value returned by an expression that can be used to map data of arbitrary size to data of a fixed size. An index generally refers to be an ordered list of elements, with references to the locations where the elements are stored.

The merge phase includes storing an index of unique identifiers of the objects in the object storages. For example, during the merge phase the garbage collector 524 stores an index of fingerprints for the file segments in the backup files 522 to a disk on the backup server 508. If the file segments in the backup files 522 include the primary backup metadata 528 and the primary backup data 530, then the garbage collection may be referred to as a cleaning of the active tier. If the file segments in the backup files 522 include the secondary backup metadata 532 and the secondary backup data 534, then the garbage collection may be referred to as a cleaning of the cloud tier. Cleaning of the cloud tier may require the backup server 508 to retrieve the secondary backup data 534 from the cloud storage 512 via the gateway server 510, and to return the secondary backup data 534 to the cloud storage 512 via the gateway server 510. Although examples may describe only one of the garbage collector 524 or the physical file verifier 546 executing an action, either one or both of the garbage collector 524 or the physical file verifier 546 can execute the action.

After storing the index of unique identifiers of the objects in the object storages, the analysis phase is executed, which includes generating a first data structure based on unique identifiers of objects in object storages, wherein positions in the first data structure correspond to hashes of the unique identifiers of the objects in the object storages. For example, the garbage collector 524 applies the first hash function 536 to the fingerprints 210 to generate the first hash vector 538, which may be a perfect hash vector.

Following the generation of the first data structure, the enumeration phase is executed, which includes setting indicators in positions in the first data structure which correspond to hashes of unique identifiers of active objects in the object storages. Setting the indicators in the positions in the first data structure can include identifying the unique identifiers of the active objects by reviewing metadata associated with the objects in the object storages, and then generating hashes of the unique identifiers of the active objects.

An indicator generally refers to a thing that provides specific information about the state or condition of something in particular. An active object generally refers to a group of information that is used by at least one program in a computer system. Metadata generally refers to a set of information that describes other information.

Figure 6:
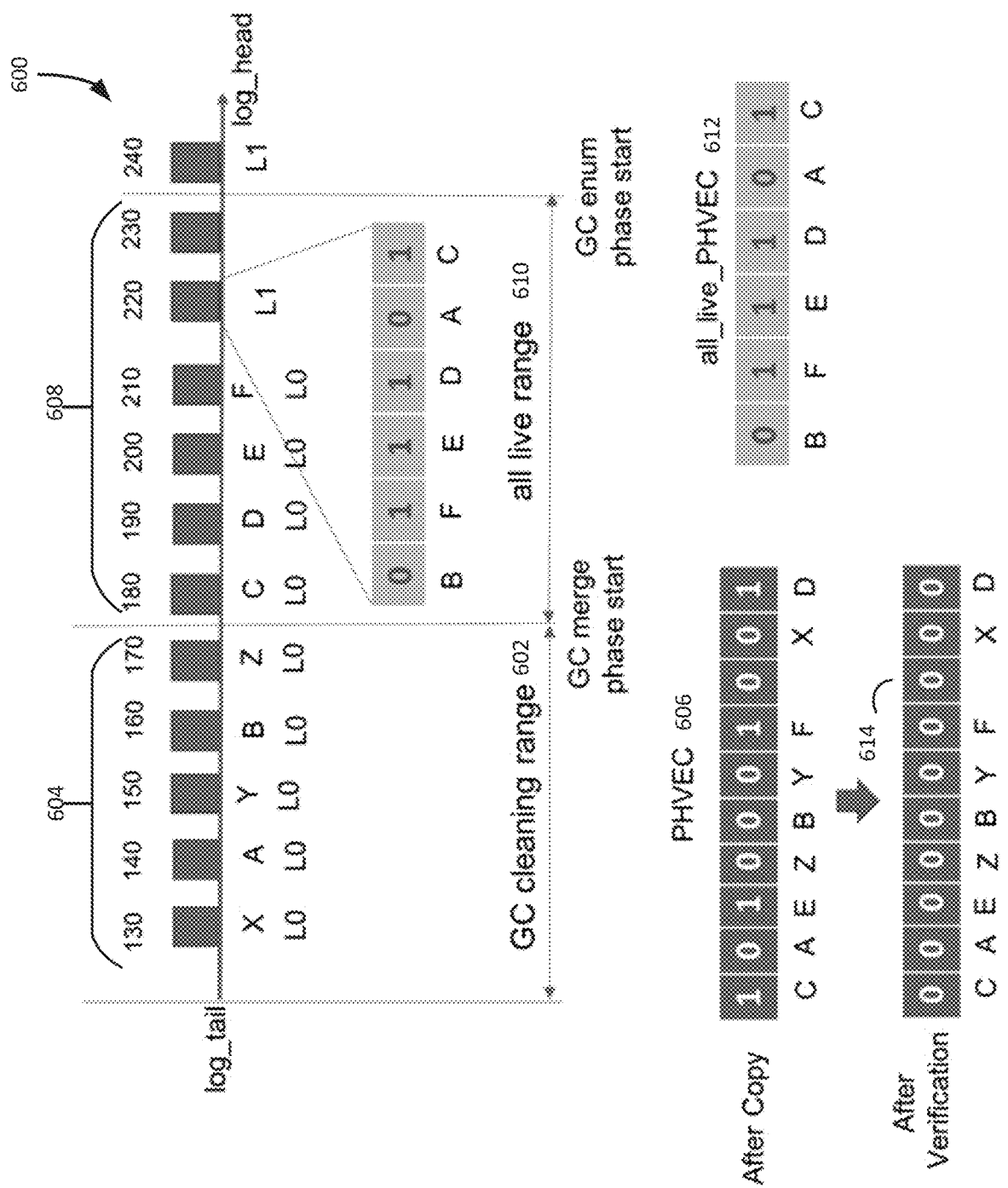
FIG. 6 illustrates yet another block diagram of containers for garbage collection integrated with physical file verification, under an embodiment.

The enumeration phase begins by identifying the unique identifiers of the active objects by reviewing metadata associated with the objects in the object storages. For example, the garbage collector 524 conducts a level-by-level review of the metadata segments for the cleaning range 602 to identify their L0 and Lp references, which include the fingerprints of the live L0 data segments 604 and the live Lp metadata segments in the containers 130-170, as depicted by FIG. 6. The enumeration phase continues by generating hashes of the unique identifiers of the active objects, and then setting indicators in positions in the first data structure which correspond to hashes of the unique identifiers of the active objects in the object storages. For example, the garbage collector 524 sets the bits in the first hash vector 538 that correspond to the hashes created by applying the first hash function 536 to the fingerprints of the live L0 data segments 604 in the containers 130-170.

Having set indicators in positions in the first data structure, the selection phase is executed, which includes determining whether a number of active objects in a first object storage satisfies a threshold. A number generally refers to an arithmetical value, expressed by a word, symbol, or figure, representing a particular quantity, and used in counting and making calculations. A threshold generally refers to the magnitude that must be satisfied for a certain reaction, phenomenon, result, or condition to occur or be manifested.

For example, the garbage collector 524 identifies the fingerprints for the L0 data segments in the container 120, applies the first hash function 536 to these identified fingerprints to create hashes, and then checks the bits in the first hash vector 538 that correspond to these hashes. If the bit for a fingerprint's hash is set to 1 in the first hash vector 538, then the bit corresponds to a fingerprint of a live object. If the bit for a fingerprint's hash is not set to 1 in the first hash vector 538, then the bit corresponds to a fingerprint of a dead object.

Continuing the example, if the garbage collector 524 has determined that only 10% of the file segments in the container 120 are dead file segments, then the garbage collector 524 bypasses selection of the container 120 for cleaning, and therefore retains the container 120 as it is. Further to this example, the garbage collector 524 resets the bits in the first hash vector 538 that correspond to the hashes of the fingerprints for the file segments in the container 120, which enables the subsequent processing of containers to not require retention of these file segments, which may be referenced as duplicates in other containers. Although this example describes the number of active objects as a percentage of dead file segments, any relative or absolute number of the active objects may be used.

In an alternative example, if the garbage collector 524 has determined that 40% of the file segments in the container 120 are dead file segments, then the garbage collector 524 selects the container 120 for cleaning. The garbage collector 524 may evaluate multiple containers in the cleaning range 602 to select any combination of these containers in the cleaning range 602 for cleaning.

Following a determination that the number of active objects in the first object storage does not satisfy a threshold, the copy phase is executed, which includes copying active objects from the first object storage to a second object storage, and resetting the indicators in positions in the first data structure which correspond to hashes of unique identifiers of active objects copied to the second object storage. Continuing the alternative example, the garbage collector 524 creates the new container 250, and copies the live file segments in the container 120 into the new container 250. Then the garbage collector 524 resets the bits in the first hash vector 538 that correspond to the hashes for the fingerprints of the file segments in the new container 250, which enables the subsequent processing of containers to not require retention of these file segments. Completing the copy phase for the alternative example, the garbage collector 524 deletes the container 120, which is a cleaning that reclaims unused storage space for subsequent reuse.

The physical file verifier 546 may not be able to correctly execute its report phase after the garbage collector 524 finishes executing the copy phase because the garbage collector 524 may set some additional bits that pollute the first hash vector 606 during its enumeration phase that the physical file verifier 546 would not have set during its enumeration phase, as depicted in FIG. 6. This setting of some additional bits occurs because the garbage collector 524 identifies the writing of segments to containers 180-230 608 which occur after the garbage collector 524 started the merge phase until the garbage collector 524 started the enumeration phase, which is depicted as the all live range 610 in FIG. 6.

For example, between the times that the garbage collector 524 started the merge and enumeration phases, the backup/restore application 520 wrote the file segments A, B, C, D, E, and F to the containers 130-210, and the corresponding metadata to the container 220. When the enumeration phase begins, the garbage collector 524 applies the first hash function 536 to the fingerprints A, B, C, D, E, and F for the file segments A, B, C, D, E, and F, respectively, and then sets the bits in the first hash vector 538 that corresponds to the hashes for the fingerprints A, B, C, D, E, and F, which pollutes the first hash vector 538. Consequently, when subsequently processing the containers 130-170 604 in the cleaning range 602, the garbage collector 524 references the bits for the hashes of the fingerprints A and B for the file segments A and B in the containers 140 and 160 as indicating live file segments. The garbage collector 524 can process the containers 140 and 160 by retaining the container 140 as it is, retaining the container 160 as it is, or creating a new container 250 and copying the live file segments in the container 140 and/or the container 160 into the new container 250. After processing the containers 140 and 160, the garbage collector 524 resets the bits in the first hash vector

606 for the hashes of the fingerprints A and B, thereby clearing the polluted bits for the hashes of the fingerprints A and B.

However, since the container 180-210 608 are not in the cleaning range 602, the garbage collector 524 will not reference the bits for the hashes of the fingerprints C, D, E, and F for the data segments C, D, E, and F in the containers 180-210 608 as indicating live file segments, such that the garbage collector 524 might not reset the bits for the hashes of the fingerprints C, D, E, and F. Whether or not the garbage collector 524 resets the bit for the hashes of the fingerprints C, D, E, and F for the data segments C, D, E, and F in the containers 180-210 608 depends on whether or not the hashes of the fingerprint C, D, E, and F collide in the first hash vector 606 with the hash of any other fingerprint.

For an example of hashes that collide, the hash for the new fingerprint D is the same as the hash for the old fingerprint X of the old file segment X that is a dead segment which is stored by the container 130. Consequently, when the garbage collector 524 processes the container 130 in the cleaning range 602, and reviews the bit set to 1 in the first hash vector 606 for the hash for the new fingerprint D, which is also the bit for the hash of the old fingerprint X, the garbage collector 524 processes the dead file segment X as a live file segment, and resets the bit that corresponds to the hash for the new fingerprint D and the old fingerprint X, thereby clearing the polluted bit for the hash of the fingerprint D.

For an example of hashes that do not collide, the hash for the new fingerprint E is different from the hashes for all other fingerprints. Consequently, since the new container 200 is not in the cleaning range 602, the garbage collector 524 will not reference the bit for the hash of the fingerprint E for the data segment E in the container 200 as indicating a live file segment, such that the garbage collector 524 does not reset the bit for the hash of the fingerprint E, thereby, retaining the polluted bit in the first hash vector 606 for the hash of the fingerprint E.

If the hash of the new fingerprint collides in the hash vector with the hash of old fingerprint for a dead segment stored in a container that is in the cleaning range 602, the garbage collector 524 processes the dead segment as a live segment, which can result in erroneously retaining the dead segment's container as is, or erroneously copying the dead segment to a new container. Such errors in the garbage collector's select and copy phases result only in a slightly inefficient cleaning of containers.

However, bits that were polluted in the first hash vector 606 and were not subsequently reset creates a challenge for the physical file verifier 546 that is leveraging the resetting of bits by the garbage collector's select phase and copy phase as the equivalent of the resetting of bits by the physical file verifier's verification phase. The physical file verifier 546 would process any bit that was polluted in the first hash vector 606 and not subsequently reset as a bit that indicates a missing file segment. Such an erroneous interpretation of a bit could result in the physical file verifier 546 needlessly conducting a level-by-level review of the metadata segments to identify their L0 references, which include the fingerprints of the live L0 data segments, applying the first hash function 536 to these identified fingerprints to create hashes, and checking the bits in the first hash vector 606 that correspond to these hashes.

Therefore, the physical file verifier 546 creates an all live hash vector to track the polluted bits in the original hash vector. The physical file verifier 546 creates an all live hash vector by reviewing the metadata segments in the containers in the all live range 610, identifying the references to the fingerprints of the live data file segments in all containers, and applies a new hash function to these fingerprints to generate the all live hash vector. A second data structure is generated based on unique identifiers of data objects created while generating the first data structure, wherein positions in the second data structure correspond to hashes of the unique identifiers of the data objects. A data object generally refers to a group of information. For example, the physical file verifier 546 reviews the metadata segments in the container 220 in the all live range 610, identifies the references to the fingerprints A, B, C, D, E. and F of the live data file segments A, B, C, D, E, and F in the containers 130-210, and applies the second hash function 540 to the fingerprints A, B, C, D, E, and F to generate the second hash vector 612, which may be an all-live perfect hash vector, as depicted by FIG. 6.

In contrast to the relatively large hash vector 606 that was generated by applying the relatively large first hash function 536 to the relatively large set of all of the fingerprints of all segments in all containers, the physical file verifier 546 generates the relatively small all-live hash vector 612 by applying the relatively small second hash function 540 to the relatively small set of fingerprints of the data objects created during the all live range 610. For example, if containers store 70 million segments that have 70 million fingerprints, then the original perfect hash vector 606, with a load factor of 7 keys to 10 bits, has a size of 100 million bits and the first hash function 536 uses 100 million bits of memory to execute, and if only 70 segments were created during the all live range 610, then the all live perfect hash vector 612, with a load factor of 7 keys to 10 bits, has a size of only 100 bits, and the second hash function 540 uses only 100 bits of memory to execute.

Following the generation of the second data structure, indicators are set in positions in the second data structure which correspond to hashes of unique identifiers of data objects that were stored in active object storages while generating the first data structure. Setting the indicators in the positions in the second data structure may include identifying the unique identifiers of the data objects that were stored in the active object storages while generating the first data structure, and then generating hashes of the unique identifiers of the data objects. An active object storage generally refers to a portion of any data retention device that retains a collection or a group of information that is used by at least one program in a computer system.

After generating the all live hash vector, the physical file verifier 546 sets the bits in the A live perfect hash vector that correspond to the hashes created by applying the new hash function to the fingerprints of the live L0 data file segments in the containers in the all live range. For example, the physical file verifier 546 sets the bits in the all live perfect hash vector 612 that correspond to the hashes created by applying the second hash function 540 to the fingerprints C, D, E, and F of the live L0 data file segments C, D, F, and F in the containers 180-210 in the all live range 610. Since the fingerprints A and B are for the file segments A and B that are stored in the containers 140 and 160 in the cleaning range 602, instead of stored in the containers 180-230 in the all live range 610, the physical file verifier 546 does not set the bits in the all live perfect hash vector 612 that correspond to the hashes created by applying the second hash function 540 to the fingerprints A and B.

Having set the indicators of the second data structure, the indicators are reset in positions in the first data structure which correspond to hashes of unique identifiers of data objects that correspond to indicators set in the positions of the second data structure. To reset the bits in the original hash vector, the physical file verifier 546 reviews the metadata segments in the all live range to identify their L0 data segments references, applies the new hash function to the fingerprints for the L0 data segments to generate the hashes of these fingerprints, and then compares the hashes of these fingerprints to their corresponding bits in the all live perfect hash vector. For example, the physical file verifier 546 reviews the metadata segments in the all live range 610 to identify their L0 data segments references, which include the fingerprints A, B, C, D, E, and F of the live L0 data file segments A, B, C, D, E, and F in the containers 130-210, and applies the second hash function 540 to the fingerprints A, B, C, D, E, and F to generate the hashes of the fingerprints A, B, C, D, E, and F. Then the physical file verifier 546 compares the hashes of the fingerprints A, B, C, D, E, and F to their corresponding bits in the all live perfect hash vector 612.

Since each bit set to 1 in the all live hash vector corresponds to a bit that polluted the original hash vector, the physical file verifier 546 generates the hash of a polluting fingerprint by applying the original hash function to a fingerprint that hashed to a set bit in the all live hash vector, and then resets the bit to 0 in the original hash vector that corresponds to the hash of the polluting fingerprint. For each indicator that is set in the second data structure, the indicator signifies that the corresponding data object was stored in an active object storage while the first data structure was being generated. For example, the second bit is set to 1 in the all live perfect hash vector 612, and the second bit corresponds to the hash of the fingerprint F, which indicates that the corresponding L0 data file segment F was written to the all live range 610, which includes the container 210 that stores the data file segment F. Therefore, since each indicator that is set in the second data structure corresponds to an indicator in the first data structure, the physical file verifier 546 applies the first hash function to the corresponding unique identifier to generate the hash of the unique identifier, and then resets the indicator in the first data structure that corresponds to the hash of the unique identifier. For example, since the second bit that is set to 1 in the all live perfect hash vector 612 corresponds to a bit that polluted the perfect hash vector 606, the physical file verifier 546 applies the first hash function 536 to the polluting fingerprint F to generate the hash of the fingerprint F, and resets the bit to 0 in the perfect hash vector 606 that corresponds to the hash of the fingerprint F. Similarly, the physical file verifier 546 also applies the first hash function 536 to the polluting fingerprints C, D, and E to generate the hashes of the fingerprints C, D, and E and resets the bits to 0 in the perfect hash vector 606 that correspond to the hashes of the fingerprints C, D, and E.

Each bit reset to 0 in the all live hash vector corresponds to a bit that originally polluted the original hash vector, and also indicates that the corresponding bit was subsequently reset in the original hash vector by the physical file verifier 546 while processing containers in the cleaning range, such that the physical file verifier 546 does not need to reset the corresponding bit in the original hash vector. For each indicator that is reset in the second data structure, the indicator signifies that the corresponding data object was not stored in an active object storage while the first data structure was being generated. For example, the first bit is reset to 0 in the all live perfect hash vector 612, and the first bit corresponds to the hash of the fingerprint B, which indicates that the corresponding L0 data file segment B was written to the cleaning range 602, which includes the container 160 that stores the data file segment B. Therefore, since each indicator that is reset in the second data structure does not corresponds to an indicator that is set in the first data structure, the physical file verifier 546 does not need to reset the indicator in the first data structure that corresponds to the hash of the corresponding unique identifier. For example, since the first bit is reset to 0 in the all live perfect hash vector 612, this bit corresponds to a bit for the hash of the fingerprint B that the physical file verifier 546 previously reset to 0 in the perfect hash vector 606 after the physical file verifier 546 either retained the container 160 as it is, or created the new container 250 and copied the live file segments in the container 160 into the new container 250. FIG. 6 depicts the state of perfect hash vector 606 at the end of the garbage collector's copy phase, with pollution caused by L0 data file segments C, D, E and F that were written in the all live range, and how the pollution was removed by resetting the bits in the perfect hash vector 614 that correspond to data file segments C, D, E and F by using the all live perfect hash vector 612.

After resetting indicators in the first data structure, a missing object is reported based on any indicators set in the first data structure. A missing object generally refers to a group of information that is unexpectedly absent. For example, the physical file verifier 546 reviews the perfect hash vector 614, which has no bits set to 1, and therefore reports to a system administrator that no missing file segments have been identified. In an alternative example, the physical file verifier 546 reviews the perfect hash vector 614, which has at least one bit set to 1, conducts a level-by-level review of the metadata segments to identify their LA) references, which include the fingerprints of the live L0 data segments, applies a hash function to these identified fingerprints to create hashes, and checks the bits in the hash vector that correspond to these hashes. When the physical file verifier 546 identifies a bit that remains set to 1 in the hash vector, the fingerprint that was used to create the hash that corresponds to the set bit is a fingerprint for a missing segment. The physical file verifier can collect the identifications of all missing segments, and then report any missing segments to a system administrator.

Since the initial phases of the physical file verifier are identical to the initial phases of the garbage collector, this integration of phases results in s more efficient computer system due to the reduced use of system resources, such as memory, central processing units, and disks. Even if a computer system's memory is insufficient to execute the garbage collector concurrently with the physical file verifier, the physical file verifier can omit its first four phases and execute only its reporting phase following the completion of the garbage collection, thereby increasing how frequently each of these components may execute.

Figure 7:
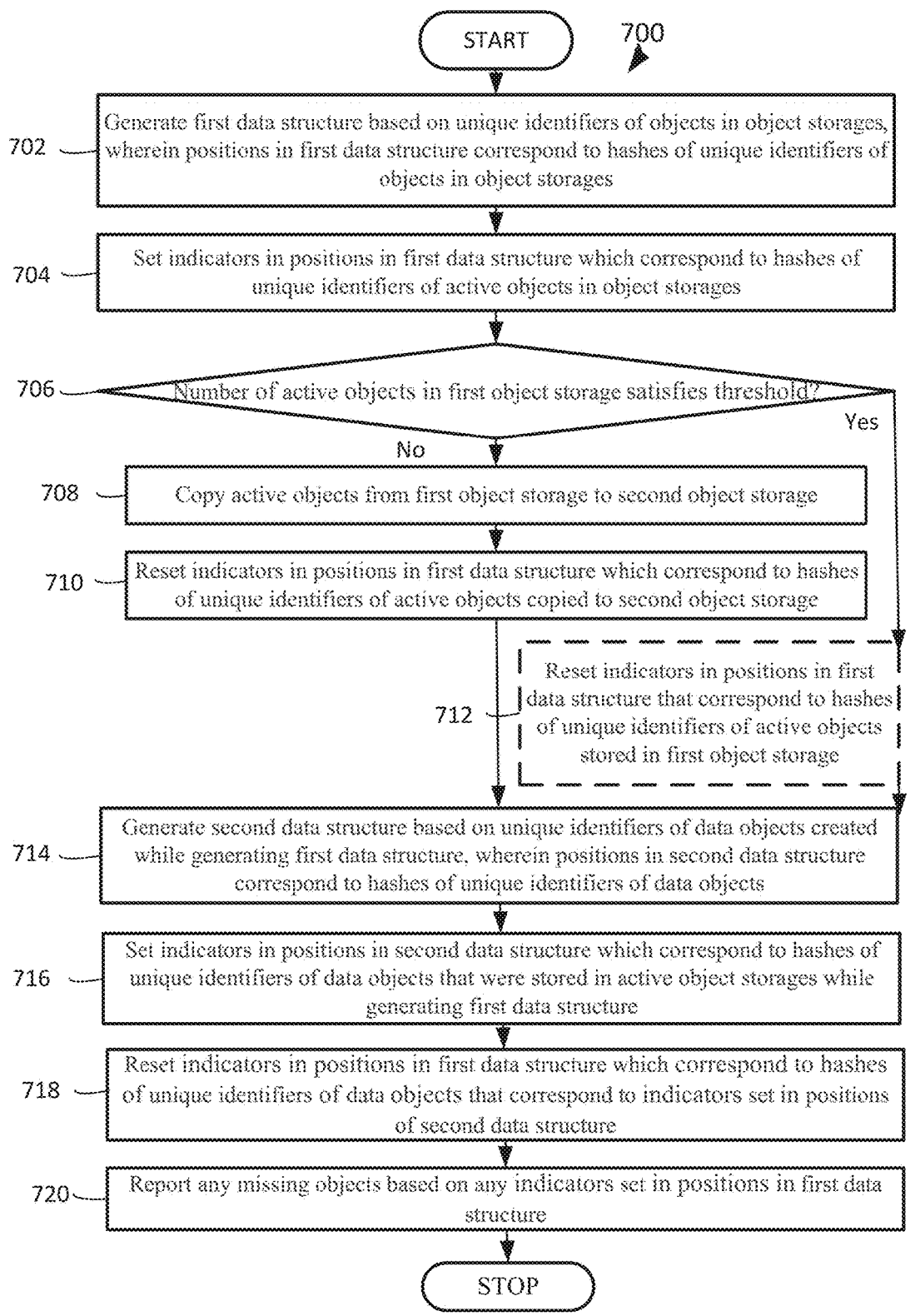
FIG. 7 is a flowchart that illustrates a method for garbage collection integrated with physical file verification, under an embodiment.

FIG. 7 is a flowchart that illustrates a method for garbage collection integrated with physical file verification, under an embodiment. Flowchart 700 illustrates method acts illustrated as flowchart blocks for certain steps involved in and/or between the clients 502-506 and/or the servers 508-510 of FIG. 5.

A first data structure is generated based on unique identifiers of objects in object storages, wherein positions in the first data structure correspond to hashes of the unique identifiers of the objects in the object storages, block 702. The system creates a hash vector for file segments. For example, and without limitation, this can include the garbage collector 524 storing an index of fingerprints for the file segments in the backup files 522 to a disk on the backup server 508, and then applying the first hash function 536 to the fingerprints 210 to generate the first hash vector 538.

After generating the first data structure, indicators are set in positions in the first data structure which correspond to hashes of unique identifiers of active objects in the object storages, block 704. The system uses live file segments to populate the hash vector. By way of example and without limitation, this can include the garbage collector 524 conducting a level-by-level review of the metadata segments for the cleaning range 602 to identify their L0 and Lp references, which include the fingerprints of the live L0 data segments 604 and the live Lp metadata segments in the containers 130-170, and then setting the bits in the first hash vector 538 that correspond to the hashes created by applying the first hash function 536 to the fingerprints of the live L0 data segments 604 in the containers 130-170.

Following the setting f indicators in the first data structure for active objects, a determination is made whether a number of active objects in a first object storage satisfies a threshold, block 706. The system evaluates whether a container needs to be cleaned. In embodiments, this can include the garbage collector 524 identifying the fingerprints for the L0 data segments in the container 120, applying the first hash function 536 to these identified fingerprints to create hashes, and then checking the bits in the first hash vector 538 that correspond to these hashes. If the bit for a fingerprint's hash is set to 1 in the first hash vector 538, then the bit corresponds to a fingerprint of a live object. If the number of active objects in the first object storage does not satisfy the threshold, the method 700 continues to block 708 to clean the first storage object. If the number of active objects in the first object storage satisfies the threshold, the method 700 proceeds to block 712 to reset the indicators in the first data structure for active objects in the first storage object.

If the number of active objects in the first object storage does not satisfy the threshold, active objects are copied from the first object storage to a second object storage, block 708. The system copies live file segments in a container being cleaned to a new container. For example, and without limitation, this can include the garbage collector 524 creating the new container 250, and then copying the live file segments in the container 120 into the new container 250.

Having copied active objects to the second object storage, the indicators are reset in positions in the first data structure which correspond to hashes of unique identifiers of active objects copied to the second object storage, block 710. The system resets the bits in the hash vector for the copied file segments. By way of example and without limitation, this can include the garbage collector 524 resetting the bits in the first hash vector 538 that correspond to the hashes for the fingerprints of the file segments in the new container 250, and then deleting the container 120. Then the method 700 continues to block 714 to create the all live hash vector.

If the number of the active objects in the first object storage satisfies the threshold, the indicators are optionally reset in positions in the first data structure that correspond to hashes of unique identifiers of the active objects stored in the first object storage, block 712. The system resets the bits in the hash vector for live file segments in a container that does not need cleaning. In embodiments, this can include the garbage collector 524 determining that only 10% of the file segments in the container 120 are dead file segments, bypassing selection of the container 120 for cleaning, and resetting the bits in the first hash vector 538 that correspond to the hashes of the fingerprints for the file segments in the container 120, After cleaning object storages, a second data structure is generated based on unique identifiers of data objects created while generating the first data structure, wherein positions in the second data structure correspond to hashes of the unique identifiers of the data objects, block 714. The system creates an all live hash vector. For example, and without limitation, this can include the physical file verifier 546 reviewing the metadata segments in the container 220 in the all live range 610, identifying the references to the fingerprints A, B, C, D, E, and F of the live data file segments A, B, C, D, E, and F in the containers 130-210, and applying the second hash function 540 to the fingerprints A, B, C, D, E, and F to generate the all live perfect hash vector 612.

Following the generation of the second data structure, indicators are set in positions in the second data structure which correspond to hashes of unique identifiers of data objects that were stored in active object storages while generating the first data structure, block 716. The system sets the bits in the all live hash vector for the live file segments stored in the containers in the all live range. By way of example and without limitation, this can include the physical file verifier 546 setting the bits in the all live perfect hash vector 612 that correspond to the hashes created by applying the second hash function 540 to the fingerprints C, D, E, and F of the live data file segments C, D, E, and F in the containers 180-210 in the all live range 610.

After setting indicators in the second data structure, the indicators are reset n positions in the first data structure which correspond to hashes of unique identifiers of data objects that correspond to indicators set in the positions of the second data structure, block 718. The system clears the bits in the original hash vector that were polluted by file segments that were written to containers in the all live range. In embodiments, this can include the physical file verifier 546 reviewing the metadata segments in the all live range 610 to identify their L0 data segments references, which include the fingerprints A, B, C, D, E, and F of the live L0 data file segments A, B, C, D, E, and Fin the containers 130-210, and applying the second hash function 540 to the fingerprints A, B, C, D, E, and F to generate the hashes of the fingerprints A, B, C, D, E, and F. Then the physical file verifier 546 compares the hashes of the fingerprints A, B, C, D, E, and F to their corresponding bits in the all live perfect hash vector 612. Since the second bit that is set to 1 in the all live perfect hash vector 612 corresponds to a bit that polluted the perfect hash vector 606, the physical file verifier 546 applies the first hash function 536 to the polluting fingerprint F to generate the hash of the fingerprint F, and resets the bit to 0 in the perfect hash vector 606 that corresponds to the hash of the fingerprint F. Similarly, the physical file verifier 546 also applies the first hash function 536 to the polluting fingerprints C, D, and E to generate the hashes of the fingerprints C, D, and E and resets the bits to 0 in the perfect hash vector 606 that correspond to the hashes of the fingerprints C, D, and E.

Following the resetting of indicators in the first data structure, any missing objects are reported based on any indicators set in positions in the first data structure, block 720. The system reports on missing file segments identified by physical file verification. For example, and without limitation, this can include the physical file verifier 546 reviewing the perfect hash vector 614, which has no bits set to 1, and therefore reporting to a system administrator that no missing file segments have been identified.

Although FIG. 7 depicts the blocks 702-720 occurring in a specific order, the blocks 702-720 may occur in another order. In other implementations, each of the blocks 702-720 may also be executed in combination with other blocks and/or some blocks may be divided into a different set of blocks.

Figure 8:
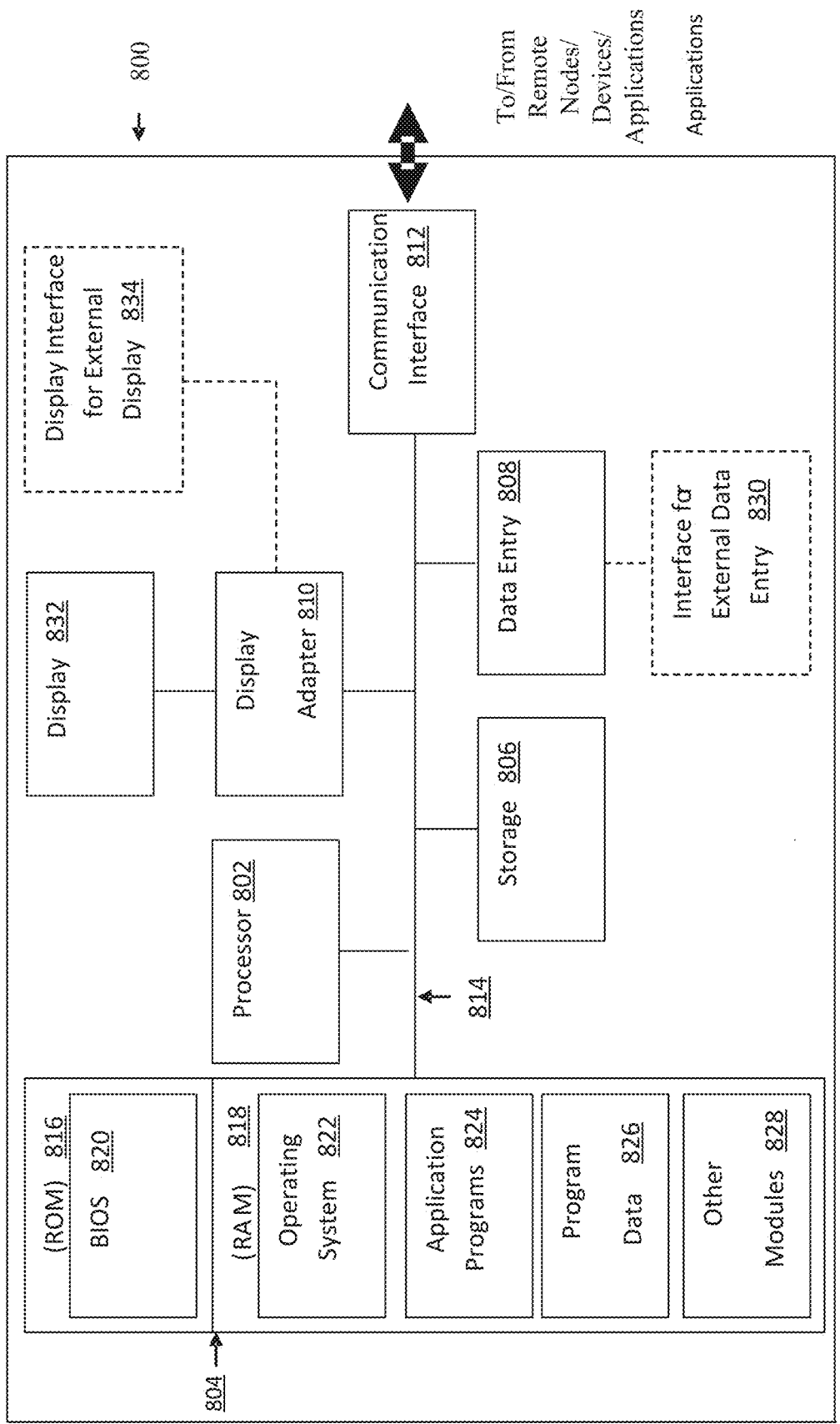
FIG. 8 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 8 may vary depending on the system implementation. With reference to FIG. 8, an exemplary system for implementing the subject matter disclosed herein includes a hardware device 800, including a processing unit 802, memory 804, storage 806, data entry module 808, display adapter 810, communication interface 812, and a bus 814 that couples elements 804-812 to the processing unit 802.

The bus 814 may comprise any type of bus architecture. Examples include a memory bus, a peripheral bus, a local bus, etc. The processing unit 802 is an instruction execution machine, apparatus, or device and may comprise a microprocessor, a digital signal processor, a graphics processing unit, an application specific integrated circuit (ASIC), a field programmable gate array (FPGA), etc. The processing unit 802 may be configured to execute program instructions stored in memory 804 and/or storage 806 and/or received via data entry module 808.

The memory 804 may include read only memory (ROM) 816 and random-access memory (RAM) 818. Memory 804 may be configured to store program instructions and data during operation of device 800. In various embodiments, memory 804 may include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 804 may also include nonvolatile memory technologies such as nonvolatile flash RAM (NVRAM) or ROM. In some embodiments, it is contemplated that memory 804 may include a combination of technologies such as the foregoing, as well as other technologies not specifically mentioned. When the subject matter is implemented in a computer system, a basic input/output system (BIOS) 820, containing the basic routines that help to transfer information between elements within the computer system, such as during start-up, is stored in ROM 816.

The storage 806 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 800.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 806, ROM 816 or RAM 818, including an operating system 822, one or more applications programs 824, program data 826, and other program modules 828. A user may enter commands and information into the hardware device 800 through data entry module 808. Data entry module 808 may include mechanisms such as a keyboard, a touch screen, a pointing device, etc. Other external input devices (not shown) are connected to the hardware device 800 via external data entry interface 830. By way of example and not limitation, external input devices may include a microphone, joystick, game pad, satellite dish, scanner, or the like. In some embodiments, external input devices may include video or audio input devices such as a video camera, a still camera, etc. Data entry module 808 may be configured to receive input from one or more users of device 800 and to deliver such input to processing unit 802 and/or memory 804 via bus 814.

A display 832 is also connected to the bus 814 via display adapter 810. Display 832 may be configured to display output of device 800 to one or more users. In some embodiments, a given device such as a touch screen, for example, may function as both data entry module 808 and display 832. External display devices may also be connected to the bus 814 via external display interface 834. Other peripheral output devices, not shown, such as speakers and printers, may be connected to the hardware device 800.

The hardware device 800 may operate in a networked environment using logical connections to one or more remote nodes (not shown) via communication interface 812. The remote node may be another computer, a server, a router, a peer device or other common network node, and typically includes many or all of the elements described above relative to the hardware device 800. The communication interface 812 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 812 may include logic configured to support direct memory access (DMA) transfers between memory 804 and other devices.

In a networked environment, program modules depicted relative to the hardware device 800, or portions thereof, may be stored in a remote storage device, such as, for example, on a server. It will be appreciated that other hardware and/or software to establish a communications link between the hardware device 800 and other devices may be used.

It should be understood that the arrangement of hardware device 800 illustrated in FIG. 8 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of hardware device 800.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 8.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the preceding description, the subject matter was described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the preceding context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system comprising:
one or more processors; and
a non-transitory computer readable medium storing a plurality of instructions, which when executed, cause the one or more processors to:
generate a first data structure based on unique identifiers of objects in object storages, wherein positions in the first data structure correspond to hashes of the unique identifiers of the objects in the object storages;
set indicators in positions in the first data structure which correspond to hashes of unique identifiers of active objects in the object storages;
determine whether a number of active objects in a first object storage satisfies a threshold;
copy active objects from the first object storage to a second object storage, in response to a determination that the number of active objects in the first object storage does not satisfy the threshold;
reset the indicators in positions in the first data structure which correspond to hashes of unique identifiers of active objects copied to the second object storage;
generate a second data structure after the copying the active objects from the first object storage to the second object storage based on unique identifiers of new data objects, the new data objects being created in the object storages while the generation of the first data structure was taking place, wherein positions in the second data structure correspond to hashes of the unique identifiers of the new data objects;
set indicators in positions in the second data structure which correspond to hashes of the unique identifiers of the new data objects that were created in the object storages while the generating the first data structure was taking place;
reset the indicators in positions in the first data structure which correspond to hashes of the unique identifiers of the new data objects that correspond to indicators set in the positions of the second data structure; and
report any missing objects based on any indicators set in positions in the first data structure.

2. The system of claim 1, wherein generating the first data structure comprises storing an index of unique identifiers of the objects in the object storages.

3. The system of claim 1, wherein setting the indicators in the first data structure position comprises identifying the unique identifiers of the active objects by reviewing metadata associated with the objects in the object storages, and generating hashes of the unique identifiers of the active objects, and setting the indicators in the second data structure positions comprises identifying the unique identifiers of the new data objects that were stored in the active object storages while generating the first data structure, and generating hashes of the unique identifiers of the new data objects.

4. The system of claim 1, wherein determining whether the number of the active objects in the first object storage satisfies the threshold comprises identifying the active objects in the first object storage by generating hashes of unique identifiers of the objects in the first object storage and identifying which of the hashes of the unique identifiers of the objects in the first object storage correspond to the indicators set in the first data structure positions.

5. The system of claim 1, wherein copying the active objects from the first object storage to the second object storage comprises creating the second object storage and deleting the first object storage.

6. The system of claim 1, wherein the plurality of instructions further causes the processor to reset the indicators in positions in the first data structure that correspond to hashes of unique identifiers of the active objects stored in the first object storage, in response to a determination that the number of the active objects in the first object storage satisfies the threshold.

7. The system of claim 1, wherein at least one of the first data structure and the second data structure is implemented as a corresponding perfect hash vector.

8. A method comprising:
generating a first data structure based on unique identifiers of objects in object storages, the first data structure having positions corresponding to hashes of the unique identifiers of the objects in the object storages;
setting indicators in the first data structure positions;
determining whether a number of active objects in a first object storage satisfies a threshold;
copying active objects from the first object storage to a second object storage, in response to a determination that the number of active objects in the first object storage does not satisfy the threshold;
resetting the indicators in the first data structure positions that correspond to hashes of unique identifiers of active objects copied to the second object storage;
generating a second data structure after the copying the active objects from the first object storage to the second object storage based on unique identifiers of new data objects, the new data objects being created in the object storages while the generation of the first data structure was taking place, wherein positions in the second data structure correspond to hashes of the unique identifiers of the new data objects;
setting indicators in the second data structure positions that correspond to hashes of the unique identifiers of the new data objects that were created in the object storages while the generating the first data structure was taking place;
resetting the indicators in the first data structure positions that correspond to hashes of the unique identifiers of the new data objects that correspond to indicators set in the second data structure positions; and
reporting any missing objects based on any indicators set in positions in the first data structure.

9. The method of claim 8, wherein generating the first data structure comprises storing an index of unique identifiers of the objects in the object storages.

10. The method of claim 8, wherein setting the indicators in the first data structure positions comprises identifying the unique identifiers of the active objects by reviewing metadata associated with the objects in the object storages, and generating hashes of the unique identifiers of the active objects, and setting the indicators in the second data structure positions comprises identifying the unique identifiers of the new data objects that were stored in the active object storages while generating the first data structure, and generating hashes of the unique identifiers of the new data objects.

11. The method of claim 8, wherein determining whether the number of the active objects in the first object storage satisfies the threshold comprises identifying the active objects in the first object storage by generating hashes of unique identifiers of the objects in the first object storage and identifying which of the hashes of the unique identifiers of the objects in the first object storage correspond to the indicators set in the first data structure positions.

12. The method of claim 8, wherein copying the active objects from the first object storage to the second object storage comprises creating the second object storage and deleting the first object storage.

13. The method of claim 8, wherein the method further comprises resetting the indicators the first data structure positions that correspond to hashes of unique identifiers of the active objects stored in the first object storage, in response to a determination that the number of the active objects in the first object storage satisfies the threshold.

14. The method of claim 8, wherein at least one of the first data structure and the second data structure is implemented as a corresponding perfect hash vector.

15. A computer program product, comprising a non-transitory computer-readable medium having a computer-readable program code embodied therein to be executed by one or more processors, the program code including instructions to:
generate a first data structure based on unique identifiers of objects in object storages, the first data structure having positions corresponding to hashes of the unique identifiers of the objects in the object storages;
set indicators in the first data structure positions;
determine whether a number of active objects in a first object storage satisfies a threshold;
copy active objects from the first object storage to a second object storage, in response to a determination that the number of active objects in the first object storage does not satisfy the threshold;
reset the indicators in the first data structure positions that correspond to hashes of unique identifiers of active objects copied to the second object storage;
generate a second data structure after the copying the active objects from the first object storage to the second object storage based on unique identifiers of new data objects, the new data objects being created in the object storages while the generation of the first data structure was taking place, wherein positions in the second data structure correspond to hashes of the unique identifiers of the new data objects;
set indicators in the second data structure positions that correspond to hashes of the unique identifiers of the new data objects that were created in the object storages while the generating the first data structure was taking place;
reset the indicators in the first data structure positions that correspond to hashes of the unique identifiers of the new data objects that correspond to indicators set in the second data structure positions; and
report any missing objects based on any indicators set in positions in the first data structure.

16. The computer program product of claim 15, wherein generating the first data structure comprises storing an Index of unique identifiers of the objects in the object storages.

17. The computer program product of claim 15, wherein setting the indicators in the first data structure positions comprises identifying the unique identifiers of the active objects by reviewing metadata associated with the objects in the object storages, and generating hashes of the unique identifiers of the active objects, and setting the indicators in the second data structure positions comprises identifying the unique identifiers of the new data objects that were stored in the active object storages while generating the first data structure, and generating hashes of the unique identifiers of the new data objects.

18. The computer program product of claim 15, wherein determining whether the number of the active objects in the first object storage satisfies the threshold comprises identifying the active objects in the first object storage by generating hashes of unique identifiers of the objects in the first object storage and identifying which of the hashes of the unique identifiers of the objects in the first object storage correspond to the indicators set in the first data structure positions.

19. The computer program product of claim 15, wherein copying the active objects from the first object storage to the second object storage comprises creating the second object storage and deleting the first object storage.

20. The computer program product of claim 15, wherein the program code includes further instructions to reset the indicators in the first data structure positions that correspond to hashes of unique identifiers of the active objects stored in the first object storage, in response to a determination that the number of the active objects in the first object storage satisfies the threshold.

* * * * *